US010163247B2

(12) United States Patent
Collet Romea et al.

(10) Patent No.: US 10,163,247 B2
(45) Date of Patent: Dec. 25, 2018

(54) CONTEXT-ADAPTIVE ALLOCATION OF RENDER MODEL RESOURCES

(71) Applicant: Microsoft Technology Licensing, LLC, Redmond, WA (US)

(72) Inventors: Alvaro Collet Romea, Seattle, WA (US); Ming Chuang, Bellevue, WA (US); Pat Sweeney, Woodinville, WA (US); Steve Sullivan, Clyde Hill, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 28 days.

(21) Appl. No.: 14/799,220

(22) Filed: Jul. 14, 2015

(65) Prior Publication Data

US 2017/0018111 A1    Jan. 19, 2017

(51) Int. Cl.
*G06T 15/00* (2011.01)
*G06T 9/00* (2006.01)
*G09G 5/391* (2006.01)

(52) U.S. Cl.
CPC .......... *G06T 15/00* (2013.01); *G06T 9/00* (2013.01); *G09G 5/391* (2013.01)

(58) Field of Classification Search
CPC ....... G06T 15/005; G06T 11/40; G06T 15/04; G06T 17/20; G06T 11/001; G06T 13/80;
(Continued)

(56) References Cited

U.S. PATENT DOCUMENTS

| 6,016,150 A | 1/2000 | Lengyel et al. |
| 6,232,974 B1 | 5/2001 | Horvitz et al. |

(Continued)

FOREIGN PATENT DOCUMENTS

| CA | 2194834 C | 9/2001 |
| WO | 1998044445 B1 | 3/1999 |
| WO | 2013174671 A1 | 11/2013 |

OTHER PUBLICATIONS

Qu, Lijun, and Gary W. Meyer. "Perceptually guided polygon reduction." IEEE Transactions on Visualization and Computer Graphics 14.5 (2008): 1015-1029.*

(Continued)

*Primary Examiner* — Sultana M Zalalee
(74) *Attorney, Agent, or Firm* — Mark K. Young; Mayer & Williams PC

(57) ABSTRACT

A computing system is configured for context-adaptive allocation of render model resources that may sacrifice some level of detail in a computational description of a 3D scene before rendering in order to accommodate resource limitations in a rendering environment such as available processor cycles, and/or bandwidth for data transmission to a processor. Such resource limitations can often preclude rendering a richly detailed 3D scene, particularly in full-motion and/or in real time. An importance function describing the relative perceptual importance of elements that make up the 3D scene is utilized to enable resources to be adaptively allocated so that more resources go to visual elements of the 3D scene that have a higher perceptual importance. The rendered output may thus optimize visual fidelity for the computational description within the resource constrained rendering environment.

14 Claims, 19 Drawing Sheets

(58) Field of Classification Search
CPC ......... G06T 15/00; G06T 15/60; G06T 17/00; G06T 2207/20076; G06T 3/0012; G06T 13/20; G06T 13/40; G06T 15/08; G06T 15/20; G06T 15/40; G06T 17/205; H04N 13/0271; H04N 19/115; H04N 13/0066; H04N 13/025; H04N 13/0253; H04N 13/026; H04N 13/0275; H04N 19/124; H04N 19/126; H04N 19/149; H04N 19/15; H04N 19/156; H04N 19/162; H04N 19/167; H04N 19/17; H04N 19/186

See application file for complete search history.

(56) References Cited

U.S. PATENT DOCUMENTS

| | | | |
|---|---|---|---|
| 6,326,964 B1 | 12/2001 | Snyder et al. | |
| 6,809,731 B2 | 10/2004 | Muffler et al. | |
| 7,174,050 B2 | 2/2007 | Balmelli et al. | |
| 7,388,585 B2* | 6/2008 | Kristiansen | G06T 15/04 345/428 |
| 7,583,275 B2 | 9/2009 | Neumann et al. | |
| 7,812,850 B1 | 10/2010 | Nelson | |
| 7,830,381 B2 | 11/2010 | Lundstrom et al. | |
| 8,587,594 B2 | 11/2013 | Mejdrich et al. | |
| 8,681,154 B1 | 3/2014 | Gardiner | |
| 2003/0123751 A1 | 7/2003 | Krishnamurthy et al. | |
| 2004/0221053 A1* | 11/2004 | Codella | H04L 47/10 709/231 |
| 2006/0139314 A1* | 6/2006 | Bell | A63F 13/02 345/156 |
| 2007/0103460 A1 | 5/2007 | Zhang | |
| 2008/0196076 A1* | 8/2008 | Shatz | H04N 1/00127 725/116 |
| 2009/0136110 A1* | 5/2009 | Kaji | G06T 5/009 382/132 |
| 2010/0061637 A1* | 3/2010 | Mochizuki | G06K 9/48 382/199 |
| 2010/0119157 A1* | 5/2010 | Kameyama | H04N 19/115 382/195 |
| 2010/0182406 A1 | 7/2010 | Benitez | |
| 2010/0226534 A1 | 9/2010 | Doria | |
| 2010/0278424 A1* | 11/2010 | Warner | G06F 3/04842 382/173 |
| 2010/0278426 A1* | 11/2010 | Piramuthu | G06T 7/11 382/173 |
| 2011/0069224 A1* | 3/2011 | Gross | G06T 3/0012 348/441 |
| 2011/0102438 A1* | 5/2011 | Mathe | G06F 3/017 345/426 |
| 2011/0286673 A1* | 11/2011 | Givon | G06T 7/11 382/199 |
| 2011/0305397 A1* | 12/2011 | Piramuthu | G06T 11/60 382/199 |
| 2012/0050481 A1 | 3/2012 | Chen et al. | |
| 2012/0056982 A1 | 3/2012 | Katz | |
| 2012/0106792 A1* | 5/2012 | Kang | G06K 9/00228 382/103 |
| 2012/0177288 A1* | 7/2012 | Chaussat | G06K 9/00281 382/165 |
| 2012/0221297 A1 | 8/2012 | Nanson et al. | |
| 2012/0276994 A1* | 11/2012 | Lansdale | A63F 13/10 463/31 |
| 2012/0313927 A1 | 12/2012 | Curington | |
| 2013/0106834 A1 | 5/2013 | Curington | |
| 2013/0271463 A1 | 10/2013 | Curington | |
| 2014/0002597 A1 | 1/2014 | Taguchi et al. | |
| 2014/0098090 A1 | 4/2014 | Schmidt | |
| 2014/0132604 A1 | 5/2014 | Bao et al. | |
| 2014/0184598 A1 | 7/2014 | Quilot et al. | |
| 2014/0184599 A1 | 7/2014 | Quilot et al. | |
| 2015/0042663 A1* | 2/2015 | Mandel | G06T 13/80 345/474 |
| 2015/0178988 A1 | 6/2015 | Montserrat Mora | |
| 2016/0100166 A1* | 4/2016 | Dragne | H04N 19/124 375/240.03 |

OTHER PUBLICATIONS

Tolgay, Ahmet. Animated mesh simplification based on saliency metrics. Diss. bllkent university, 2008.*

Shan, et al., "Occluding Contours for Multi-View Stereo", In Proceedings of Conference on Computer Vision and Pattern Recognition, Jun. 24, 2014, (8 pages total).

Cheung, et al.,"Visual Hull Alignment and Refinement across Time: A 3D Reconstruction Algorithm Combining Shape-From-Silhouette with Stereo", In Proceedings of IEEE Computer Society Conference on Computer Vision and Pattern Recognition, vol. 2, Jun. 18, 2003, (8 pages total).

Li, et al., "Combining Stereo and Visual Hull Information for On-line Reconstruction and Rendering of Dynamic Scenes", In Proceedings of IEEE Workshop on Multimedia Signal Processing, Dec. 9, 2002, (4 pages total).

Cremers, et al., "Multiview Stereo and Silhouette Consistency via Convex Functionals over Convex Domains", In Journal of IEEE Transactions on Pattern Analysis and Machine Intelligence, vol. 33, Issue 6, Jun. 1, 2011, (14 pages total).

Lin, et al., "3D Reconstruction by Combining Shape from Silhouette with Stereo", In Proceedings of 19th International Conference on Pattern Recognition, Dec. 8, 2008, (4 pages total).

Sinha, et al., "Multi-view Reconstruction using Photo-consistency and Exact Silhouette Constraints: A Maximum-Flow Formulation", In Proceedings of Tenth IEEE International Conference on Computer Vision, vol. 1, Oct. 17, 2005, (8 pages total).

Goesele, et al., "Multi-View Stereo Revisited", In Proceedings of IEEE Computer Society Conference on Computer Vision and Pattern Recognition, vol. 2, Jun. 17, 2006, (8 pages total).

Labatut, et al., "Efficient Multi-View Reconstruction of Large-Scale Scenes using Interest Points, Delaunay Triangulation and Graph Cuts", In Proceedings of IEEE 11th International Conference on Computer Vision, Oct. 14, 2007, (8 pages total).

Sinha, et al., "Multi-View Stereo via Graph Cuts on the Dual of an Adaptive Tetrahedral Mesh", In Proceedings of IEEE 11th International Conference on Computer Vision, Oct. 14, 2007, (8 pages total).

Bleyer, et al., "PatchMatch Stereo—Stereo Matching with Slanted Support Windows", In British Machine Vision Conference, Aug. 29, 2011, (2 pages total).

Furukawa, et al., "Carved Visual Hulls for Image-Based Modeling", In International Journal of Computer Vision, vol. 81, Issue 1, Jan. 2009, (15 pages total).

Furukawa, et al., "Accurate, Dense, and Robust Multiview Stereopsis", In IEEE Transactions on Pattern Analysis and Machine Intelligence, vol. 32, Issue 8, Aug. 2010, (8 pages total).

Esteban, et al., "Silhouette and Stereo Fusion for 3D Object Modeling", In Proceedings of Computer Vision and Image Understanding, vol. 96, Issue 3, Dec. 2004, (27 pages total).

Song, et al., Volumetric Stereo and Silhouette Fusion for Image-Based Modeling, In Journal of the Visual Computer,14 vol. 26, Issue 12, Dec. 1, 2010, (8 pages total).

Pass, et al., "Comparing Images Using Joint Histograms", ACM Journal of Multimedia Systems, vol. 7, No. 3, pp. 234-240 (1999) (15 pages total).

Grad Project: 3D Printing, Retrieved from :http://lloydramsay-gradproject.blogspot.com, Oct. 19, 2011; Retrieved on Jun. 17, 2015 (20 pages total).

Havemann, et al., "Progressive Combined B-reps—Multi-Resolution Meshes for Interactive Real-time Shape Design ", In Proceedings of 16th International Conference in Central Europe on Computer Graphics, Visualization and Computer Vision, Feb. 4, 2008, (16 Pages total).

(56) References Cited

OTHER PUBLICATIONS

Boubekeur, et al., "Generic Adaptive Mesh Refinement", Published on: Dec. 12, 2008 Available at: http://http.developer.nvidia.com/GPUGems3/gpugems3_ch05.html (14 pages total).

Dyken, et al., "Semi-Uniform Adaptive Patch Tessellation", In Proceedings of Computer Graphics Forum, vol. 28, Issue 8, Dec. 2009, pp. 1-9 (9 pages total).

Zhang, et al. "An Efficient Method of Key-Frame Extraction Based on a Cluster Algorithm", In Journal of Human Kinetics, vol. 39, Dec. 18, 2013, pp. 5-13 (9 pages total).

Xiao, et al., "An Efficient Keyframe Extraction from Motion Capture Data", In Proceedings of 24th International Conference on Advances in Computer Graphics, Jun. 26, 2006, (2 Pages total).

Meyer, et al., "Particle-based Sampling and Meshing of Surfaces in Multimaterial Volumes", In Journal of IEEE Transactions on Visualization and Computer Graphics, vol. 14, Issue 6, Nov. 1, 2008, (8 pages total).

Zhou, et al., "Large Mesh Deformation Using the Volumetric Graph Laplacian", In Proceedings of ACM SIGGRAPH, vol. 24, Issue 3, Jul. 31, 2005, pp. 496-503 (8 pages total).

"Shape Uncertainty and Variability", Published on: Oct. 16, 2010 Available at: http://lgg.epfl.ch/research.php?p=7 (8 pages total).

"Deforming Surfaces and Using the Mesh Modifiers in 3ds Max", Retrieved on: Nov. 12, 2014 Available at: http://3dmaxhub.com/deforming-surfaces-and-using-the-mesh-modifiers-in-3ds-max/ (24 pages total).

Kazhdan, et al., "Poisson Surface Reconstruction", In Proceedings of Eurographics Symposium on Geometry Processing, Jun. 2006, (10 pages total).

Li, et al., "Robust Single-View Geometry and Motion Reconstruction", In Journal of ACM Transactions on Graphics, vol. 28, Issue 5, Dec. 2009, (10 pages).

Brown, et al., "Visual Attention-based Polygon Level of Detail Management", In Proceedings of the 1st International Conference on Computer Graphics and Interactive Techniques in Australasia and South East Asia, Feb. 2003, (8 pages total).

Bible, John, "Attentional Flow Networks: A Real-Time Adaptive Display Technique", In Thesis of Master of Science, Aug. 18, 2000, (175 pages total).

Brown, et al., "Visual Importance-biased Image Synthesis Animation", In Proceedings of the 1st International Conference on Computer Graphics and Interactive Techniques in Australasia and South East Asia, Feb. 2003, (9 pages total).

Lengyel, et al., "Rendering with Coherent Layers", In Proceedings of the 24th Annual Conference on Computer Graphics and Interactive Techniques, Aug. 1997, (10 pages total).

"Microsoft Research Face SDK Beta", Retrieved on: Nov. 19, 2014, Available at: http://research.microsoft.com/en-us/projects/facesdk/ (2 pages total).

"Skeletal Tracking", Retrieved on: Nov. 19, 2014, Available at: http://msdn.microsoft.com/en-us/library/hh973074.aspx (3 pages total).

Hoppe, Hugues, "New Quadric Metric for Simplifying Meshes with Appearance Attributes", In Proceedings of the 10th IEEE Visualization Conference, Oct. 1999, (8 pages total).

"Using UVAtlas (Direct3D 9)", Retrieved on: Nov. 19, 2014, Available at: http://msdn.microsoft.comien-us/library/windows/desktop/bb206321(v=vs.85).aspx (5 pages total).

Catmull, et al., "Recursively Generated B-Spline Surfaces on Arbitrary Topological Meshes", In Proceedings of Computer-Aided Design, vol. 10, Issue 6, Nov. 1978, pp. 350-355. (6 pages total).

Chen, et al., "Scalable Real-Time Volumetric Surface Reconstruction", In Proceedings of ACM Transactions on Graphics, vol. 32, No. 4, Jul. 2013, (2 pages total).

Alexa, et al., "Point Set Surfaces", In Proceedings of the conference on Visualization, Oct. 21, 2001, (8 pages total).

Clark, James. H., "Hierarchical Geometric Models for Visible Surface Algorithms", In Proceedings of Communications of the ACM, vol. 19, Issue 10, Oct. 1976, (8 pages total).

Williams, Lance, "Pyramidal Parametrics", In Proceedings of ACM SIGGRAPH Computer Graphics, vol. 17, Issue 3, Jul. 1983, (11 pages total).

Nießner, et al., "Feature-Adaptive GPU Rendering of Catmull-Clark Subdivision Surfaces", In Journal ACM Transactions on Graphics, vol. 31, Issue 1, Jan. 2012, (11 pages total).

Akbarzadeh et al., Towards Urban 3D Reconstruction From Video, Proceedings of the Third International Symposium on 3D Data Processing, Visualization, and Transmission (3DPVT'06), 2006, (8 pages total).

"International Search Report and Written Opinion Issued in PCT Application No. PCT/US2016/037459", dated Sep. 7, 2016, (13 Pages total).

Merrell, et al., "Real-Time Visibility Based Fusion of Death Maps", In Proceedings of the IEEE 11th International Conference on Computer Vision, Oct. 14, 2007, (8 pages total).

Pauly, et al., "Uncertainty and Variability in Point Cloud Surface Data", In the Proceeding of Eurographics Symposium on Point-Based Graphics, Jan. 2004, (8 Pages total).

Wheeler, et al., "Consensus Surfaces for Modeling 3D Objects from Multiple Range Images", In the International Conference on Computer Vision, Jan. 1, 1998, pp. 917-924. (8 Pages total).

Hornung, et al., "Robust Reconstruction of Watertight 3D Models from Non-Uniformly Sampled Point Clouds Without Normal Information", In the Proceeding of Eurographics Symposium of Geometry Processing, Jan. 2006, (10 Pages total).

Schnabel, et al., "Efficient RANSAC for Point-Cloud Shape Detection", In the Forum of Computer Graphics, vol. 26, Issue 2, Jun. 1, 2007, pp. 214-226 (13 Pages total).

"International Search Report and Written Opinion Issued in PCT Application No. PCT/US2016/039474", dated Oct. 27, 2016, (13 Pages total).

Nizam Anuar et al., "Extracting Animated Meshes with Adaptive Motion Estimation", Nov. 16, 2004, Stanford, USA, Retrieved from the Internet: https://pdfs.semanticscholar.org/1f96/7ce471cdfb859cb6ed8207d8af25f968c015.pdf?ga=1_252482382.695399578.1476716265—[retrieved on Oct. 19, 2016] (9 pages total).

Cedric Cagniart, Edmond Boyer, Slobodan Ilic. Iterative Deformable Surface 'Tracking in Multi-View Setups. 3DPVT 2010—5th International Symposium on 3D Data Processing, Visualization and 'Transmission, May 2010, Paris, France. 2010. <inria-00568910> (9 pages total).

Schwarz, Michael, and Marc Stamminger. "Fast GPU-based Adaptive Tessellation with CUDA." Computer Graphics Forum 28.2 (2009): 365-374. (10 pages total).

Bernard, Pierre, Aaron Hertzmann, and Michael Kass. "Computing Smooth Surface Contours with Accurate Topology." TOG ACM Trans. Graph. ACM Transactions on Graphics 33.2 (2014): 1-21. (20 pages total).

Prada, Fabian, Misha Kazhdan, Ming Chuang, Alvaro Collet and Hugues Hoppe. "Motion Graphs for Unstructured Textured Meshes." ACM Trans. Graphics (SIGGRAPH), 35(4), (2016): Article No. 108, (14 pages total).

Anuar, et al. "Extracting Animated Meshes with Adaptive Motion Estimation", Retrieved From <<https://pdfs.semanticscholar.org/1f96/7ce471cdfb859cb6ed8207d8af25f968c015.pdf >>, Nov. 16, 2004, 9 Pages.

Cagniart, et al. "Iterative Deformable Surface Tracking in Multi-View Setups", In the proceedings of 3DPVT in International Symposium on 3D Data Processing, Visualization and Transmission, May 17, 2010, 9 Pages.

"International Search Report and Written Opinion Issued in PCT Application No. PCT/US2016/039474", dated Oct. 27, 2016, 12 Pages.

"Second Written Opinion Issued in PCT Application No. PCT/US2016/042174", dated Jan. 16, 2017, (6 Pages total).

Abderrahim, et al., "Interactive Multiresolution Visualization of 3D Mesh", In the Proceedings of the International Journal of Computer Applications, vol. 67, Issue 14, Apr. 2013, (7 Pages total).

(56) References Cited

OTHER PUBLICATIONS

Barni, et al., "Salient Clustering for View-dependent Multiresolution Rendering", In 2009 XXII Brazilian Symposium on Computer Graphics and Image Processing, Oct. 11, 2009, pp. 56-63 (8 pages total).

Heckbert, et al., "Multiresolution Modeling for Fast Rendering", In the Proceedings of Graphics Interface, May 18, 1994, pp. 43-50 (8 pages total).

Lluch, et al., "Multiresolution 3D Rendering on Mobile Devices", In the Proceedings of Computational Science—ICCS 2006, vol. 3992 of the series Lecture Notes in Computer Science, Jan. 1, 2006, pp. 287-294 (8 pages total).

"International Search Report and Written Opinion Issued in PCT Application No. PCT/US2016/042174", dated Oct. 21, 2016, (11 Pages total).

"International Preliminary Report on Patentability Issued in PCT Application No. PCT/US2016/042174", dated Apr. 7, 2017, (6 Pages total).

\* cited by examiner

CONTEXT-ADAPTIVE ALLOCATION OF RENDER MODEL RESOURCES

BACKGROUND

Certain visual elements of a particular three-dimensional (3D) scene rendered on a computing platform are typically more finely perceptible than others to a human viewer. When a scene is reduced in level of detail for rendering, if all areas of the scene are treated with equal perceptual importance, and details therein preserved in equal proportion, then details in perceptually important areas are bound to be decimated during a downsampling process, while details in less perceptually important areas will be retained. The resulting rendering using a nominally equitable resource allocation ends up wasting resources on visually trivial or perceptually unimportant content.

SUMMARY

A computing system is configured for context-adaptive allocation of render model resources that may sacrifice some level of detail in a computational description of a 3D scene before rendering in order to accommodate resource limitations in a rendering environment such as available processor cycles, and/or bandwidth for data transmission to a processor. Such resource limitations can often preclude rendering a richly detailed 3D scene, particularly in full-motion and/or in real time. An importance function describing the relative perceptual importance of elements that make up the 3D scene is utilized to enable resources to be adaptively allocated so that more resources go to visual elements of the 3D scene that have a higher perceptual importance. The rendered output may thus optimize visual fidelity for the computational description within the resource constrained rendering environment.

In various illustrative examples, the visual elements of the 3D scene may be evaluated to identify elements having an elevated perceptual importance to the 3D scene. If a given 3D scene depicts humans and/or anthropomorphic characters, then the face and hands may be considered to be more perceptually important than other elements. A face detection methodology can be executed on images of the 3D scene to identify faces and/or a skeletal tracker can aid in identifying hands and/or face. Skin tones sampled from an area identified as a face can be used as a reference to identify other skin-colored areas in the scene. Those other skin-colored areas are presumed to be hands which may also be more perceptually important. Certain defined images and/or visual patterns in the 3D scene, including sponsor logos or the like, may be identified and assigned a higher importance. Once identified, visual elements of the 3D scene that make up a face, hands, or other elements of higher visual importance can be encoded with an elevated importance value. The importance function may comprise a combination of importance values that make up the 3D scene.

When the scene is reduced in detail before rendering, details are preserved for those visual elements that have been assigned an elevated importance value. This may be performed by applying the importance function as a weighting value to each element of the 3D scene in which the likelihood that any particular detail will be discarded by way of simplification varies inversely with the importance function value of that element. In cases in which objects in the 3D scene are represented by a wire frame mesh of points and edges to which texture maps are applied, the importance value can be applied to points of the point cloud and/or texels of the texture map. The importance value of points and texels can also be determined independently, and the independent importance functions applied to their respective reduction of detail.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DESCRIPTION OF THE DRAWINGS

Like reference numerals refer to like elements in the drawings. Elements are not drawn to scale unless otherwise indicated.

DETAILED DESCRIPTION

The concept of perceptual importance is based in physiological studies that have found that certain features or visual elements in a scene or image draw the viewers' attention more than others. See, e.g., Brown, et al., Visual Attention-based Polygon Level of Detail Management, Proceedings of the 1st International Conference on Computer Graphics and Interactive Techniques in Australasia and South East Asia, pp. 55-62 (2003). Therefore these high-attention visual elements are considered to have an elevated perceptual importance. Moreover, by increasing visual fidelity to those elements that have an elevated perceptual importance the viewers' perceived quality of the overall scene is increased.

The present state of the art is such that limitations on real-time computer graphic recreation are largely hardware-based. Computer-based graphic animation often involves the visual presentation of millions of visual elements each frame. As such, at some level, a physical limitation of the render processing hardware can be reached. In addition, for those instances in which the display is remote from the source of the graphic content, those millions of visual elements require a commensurate communications data load. Thus, a limitation on the communication bandwidth available can become a limiting factor. Conventional solutions typically simply reduced detail to accommodate these hardware limitations, to the detriment of the visual fidelity on the rendering. However, the present context-adaptive allocation of render model resources may achieve an improvement in visual fidelity in the representation within the constraints of the existing hardware resources. That is, an improvement in the functioning of existing and/or future hardware may be realized beyond what such hardware is conventionally able to support.

Figure 1:
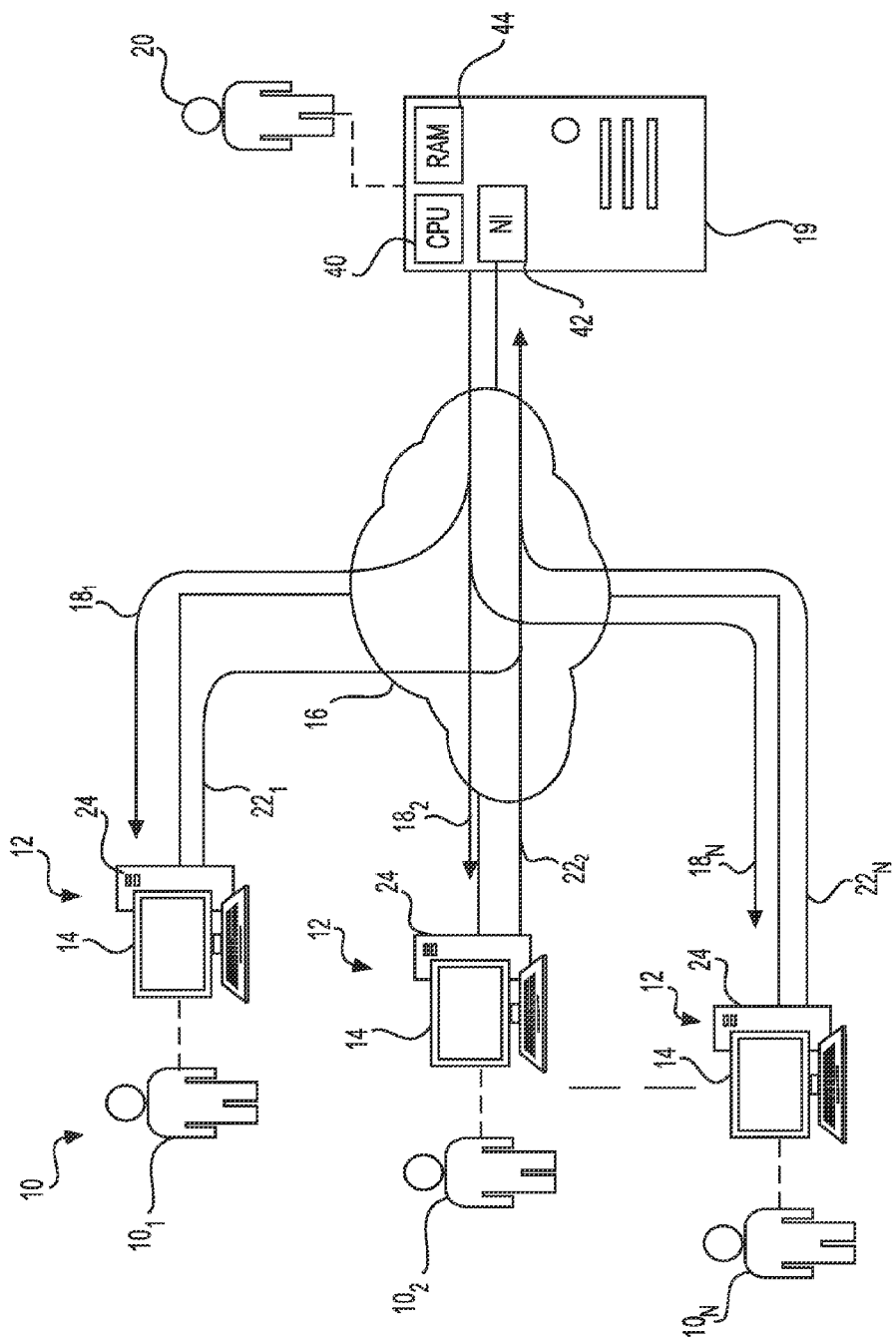
FIG. 1 illustrates schematically a system and runtime environment involving real-time distributed remote rendering of a virtual three-dimensional (3D) environment.

Turning now to drawings, FIG. 1 shows an illustrative system and runtime environment involving real-time distributed remote rendering of a virtual three-dimensional (3D) environment. The environment may include, as an example only and without limitation, a real-time gaming environment. A plurality of viewers, typically 10, or individually $10_1$ through $10_N$, are remotely located from one another and also from a content source provider 20. Each viewer 10 has a rendering device 12 and an associated graphic display 14, for depicting rendered video and/or images of the virtual 3D environment. Each viewer 10 may be in communication with the content source provider 20 via a communications network 16, examples of which include a wireless communications network, the Internet, and/or a virtual private channel over a publicly switched network, or some combination of these, all without limitation.

The content source provider 20 will typically use a server 19 including one or more processors 40, a network interface 42 for communication (e.g., with rendering device 12 via network 16), and one or more computer-readable storage devices 44 such as memories storing instructions which, when executed by the one or more processors 40, cause the one or more processors 40 to carry out a program of instruction consistent with the present principles. The computer-readable storage device 44 is identified in FIG. 1 as a Random Access Memory (RAM), though it could equally be a ROM, hard disk, a removable magnetic disk (e.g., a floppy disk), a removable optical disk such as a CD (compact disc), DVD (digital versatile disc), or other optical media, magnetic cassettes, flash memory cards, digital video disks, data cartridges and the like.

The viewers 10 may be strictly passive recipients of information 18. In some implementations, viewers 10 may be interactively providing viewer data 22. Viewer 10 interactivity may extend solely to the rendering device 12, such as selection of viewpoint, lighting or color palate for rendering images of the virtual 3D environment, or other aspects visible only to that viewer 10. The viewer may also interact with the virtual 3D environment itself. Data 22 of the viewer 10 interactions will be communicated back to the content source provider 20. They may also thereafter be shared with peer viewers 10, to the extent that one viewer's $10_i$ interaction with the virtual 3D environment is visible to peer viewers $10_j$. Any of the viewers 10 may also be a source of audio or video data, provided to the source provider 20 and/or shared with peer viewers 10 directly or indirectly, via network 16.

An illustrative implementation of a runtime environment described above with reference to FIG. 1 includes a real-time multi-player gaming environment. Each viewer 10 who participates as a player in the game may have a multimedia gaming console 24 serving as his/her rendering device 12. The source provider 20 can communicate information 18 used by the rendering device 12 related to the game play environment. One or more viewers 10 may engage in game play using the multimedia gaming console 24. The viewer's interaction with the gaming environment can be communicated back to the content source provider 20 as viewer data 22. The viewer data 22 may then incorporated into the information 18 subsequently sent to all viewers 10 as part of the continuing game play.

Figure 2A:
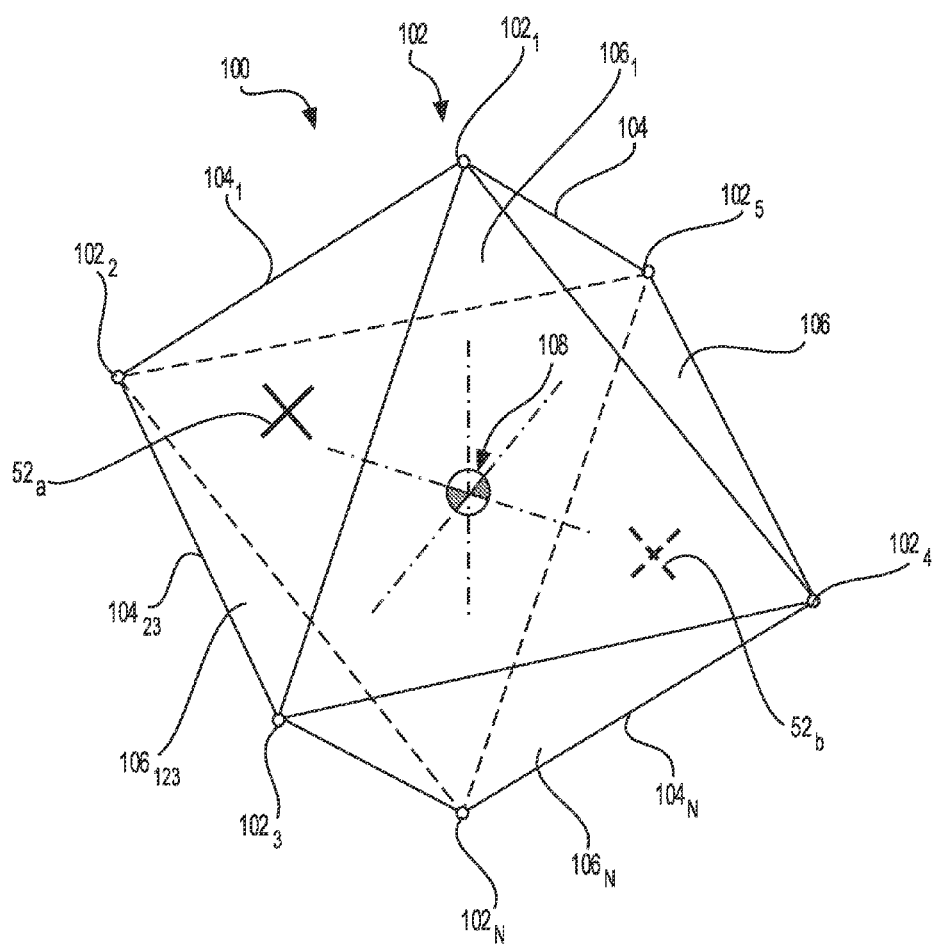
FIG. 2A depicts a wire frame mesh representing a solid object to be depicted in a virtual 3D environment.
Figure 2B:
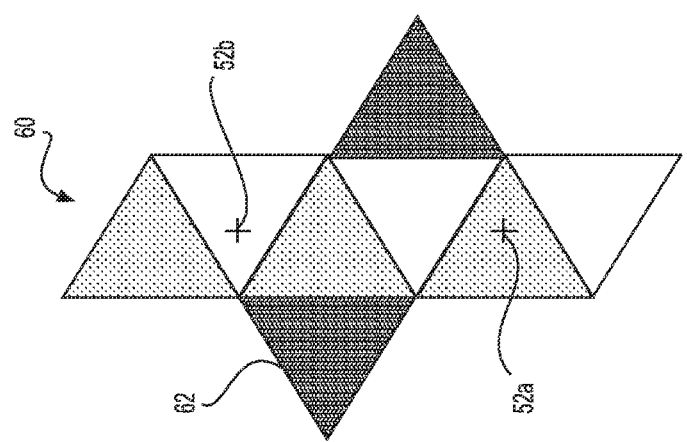
FIG. 2B depicts a texture map to be applied to the wire frame mesh of FIG. 2A.

Various illustrative rendering techniques are now described. Consider that one element of the virtual 3D environment to be rendered represents a sphere having certain representative indicia 52a, 52b, depicted thereon in diametrically opposed locations. For the purpose of rendering in the virtual 3D environment, any 3D solid can be approximated as a wire frame mesh 100, as shown in FIG. 2A, and a texture map 60 applied thereto, as shown in FIG. 2B. In this case, a given triangular face of the texture map 60 may be considered as a texel 62.

Wire frame 100 may include a fixed number of points 102, numbered $102_1$ through $102_N$. Points 102 are connected with respective adjacent points 102 by edges 104, numbered $104_1$ through $104_N$. In some implementations, edges 104 may be specified according to the points that they connect. For example, the edge 104 connecting points $102_2$ and $102_3$ may be designated as edge $104_{23}$. A group of points 102 and their connecting edges 104 that lie in the same plane at the perimeter of the wire frame 100 each define respective faces 106, numbered as $106_1$ through $106_N$. Here again, as alternative, faces 106 may be specified by the respective numbers of the points that lie therein. For example, the face 106 including points $102_1$, $102_2$, and $102_3$ can be designated as face $106_{123}$.

Each point 102 of the wire frame 100 can be selected to lie equidistant from a center 108 of the wire frame 100, along one of three mutually perpendicular axes. Thus, each point 102 may represent a point on the surface of the sphere. In order to render an image of the sphere, the sphere and the wire frame 100 are conceptually collocated. Then, the surface detail at the surface of the sphere may be projected onto a face 106 of the wire frame 100. The resulting projection of the surface detail forms a texture map 60, as shown in FIG. 2B. In order to render a representation of the sphere in the virtual 3D environment, the wire frame 100 is positioned and oriented virtually, and the texture map 60 is applied thereto.

As shown, the wire frame 100 depicted in FIG. 2A is in the shape of a regular octahedron, having eight equilateral triangular faces 106. The image of FIG. 2A is simplified for sake of clarity and employs a simple case for the purpose of illustration herein. More complex geometries, both regular and irregular, including greater numbers of points, edges and faces, and/or faces having more than three edges, etc., may be readily apparent in light of the present principles as well as the application of such principles to such higher order geometries.

Figure 3A:
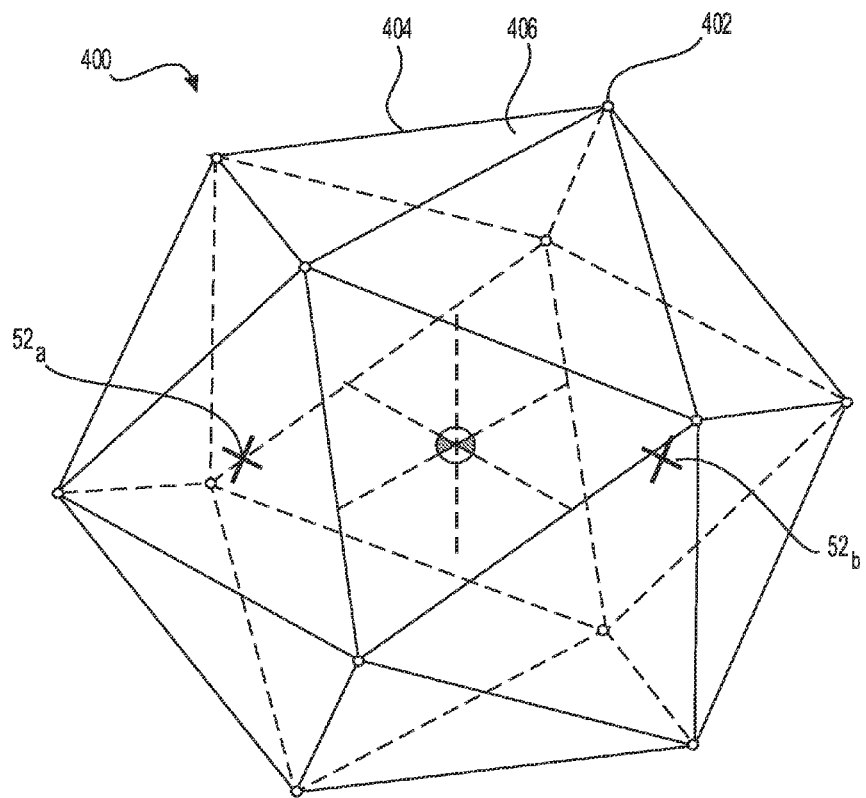
FIG. 3A depicts an alternative embodiment of a wire frame mesh representing a solid object to be depicted in a virtual 3D environment.
Figure 3B:
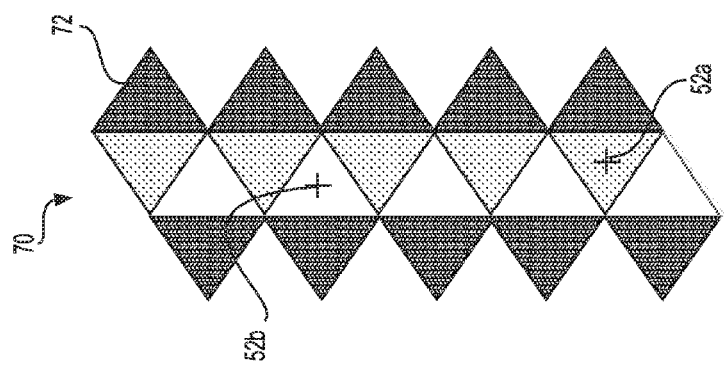
FIG. 3B depicts a texture map to be applied to the wire frame mesh of FIG. 3A.

To increase the visual fidelity of the sphere in the virtual 3D environment, more complex geometries may be employed. Referring now to FIG. 3A, consider that the sphere may also be approximated by a regular, 20-sided icosahedron wire frame 400. As with the wire frame 100 discussed above, the wire frame 400 may be seen to have points 402, adjacent points being connected by edges 404, and co-planar edges defining faces 406. Like the octahedron wire frame 100, all faces of the regular icosahedron wire frame 400 are equilateral triangles. To render the sphere using the icosahedron wire frame model 400, the surface of the sphere may be projected onto the faces of a co-located icosahedron wire frame to form a texture map 70, as shown in FIG. 3B. In this case, the triangular face of the texture map 70 may be considered as a texel 72. The texture map 70 is depicted on the wire fame 400 as it is oriented in the virtual 3D environment.

As compared with the octahedron wire frame 100 of FIG. 2A, which has six (6) points 102 (or vertices), twelve (12) edges 104, and eight (8) faces 106, the icosahedron wire frame 400 of FIG. 3A has twelve (12) points 402, thirty (30) edges 404, and twenty (20) faces 406. Notwithstanding the increase in visual fidelity using the icosahedron wire frame 400 over the octahedron wire frame 100, it typically consumes more computing resources to render the icosahedron wire frame 400 as compared with the octahedron wire frame 100. It may also consume additional communication bandwidth between a content source 20 and the rendering engine 12 to communicate the data necessary to render the more complex geometry. Therefore, to render a scene in which the sphere is but one object, for example in real-time video motion at a rate in a range of approximately 24-30 frames per second, a resource budget which correlates with a limitation on wire mesh faces is established.

Within a given resource budget, however, choices in resource allocation can affect the visual quality of the overall scene. Traditional methods for resource allocation in run-time rendering typically adjust the representation complexity of three dimensional subjects to be rendered, such that needed resources can be met by those which are currently available. To set and/or adjust geometry complexity, this is commonly referred to as using Level-of-Detail (LoD) models. One such method is described by Clark, J., in "Hierarchical geometric models for visible surface algorithms", Communications of the ACM 19, 10 (October 1976), pp. 547-554. To set and/or adjust texture complexity, one type of strategy is commonly referred to as "mip-mapping," and is described by Williams, L., "Pyramidal Parametrics", ComputerGraphics (Proc. Siggraph '83), Vol. 17, No. 3, July, 1983, pp. 1-11.

In the case of both geometric complexity and texture complexity, the implementations described above involve downsampling the original representation recursively to obtain a multi-resolution hierarchy. This downsampling sacrifices object detail complexity to accommodate resource constraints. The highest resolution that can be accommodated by the most limiting resource (e.g., rendering engine 12 processor cycles, and/or transmission bandwidth for information 18 and/or viewer data 22) is then used at run time. In consideration of the above described representation of a sphere, icosahedron wire frame 400 may be downsampled to a representation by octahedron wire frame 100, which uses fewer resources.

Unfortunately, although such approaches adequately render subjects as smoothly as permitted by the available resources, they do not necessarily produce optimal visual quality consistent with those resource constraints. This is because certain areas of any scene are more perceptually important than others. If all areas of the rendered scene are treated with equal perceptual importance, and details therein preserved in equal proportion, then details in perceptually important areas are typically bound to be decimated during the downsampling process, while details in less perceptually important areas may be retained. The resulting rendering using a nominally equitable resource allocation may thus end up wasting resources on visually trivial or perceptually unimportant content.

By comparison, a rendering system and methodology using the present context adaptive allocation of render model resources may enable a given 3D object to be rendered for which an importance function is defined for various areas of its surface. The importance function may be viewed as being analogous to a heat map describing which parts of an object are important, and how perceptually important such parts are, through use of a scalar function. Once an importance function is defined, the importance function may be used to adaptively guide the allocation of rendering resources, for example by assigning additional density of polygons and/or texels to represent areas of contextually higher importance for higher fidelity reproduction of specified areas in the scene.

Figure 4:
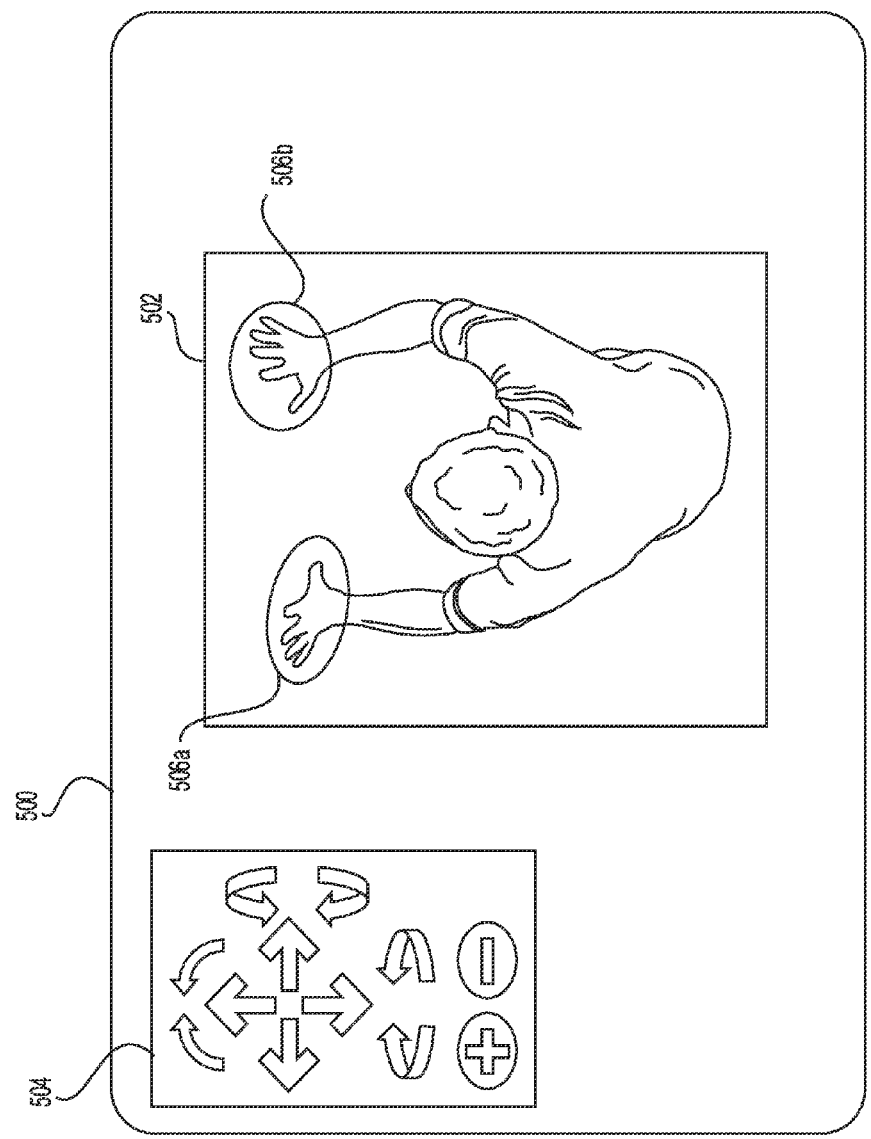
FIG. 4 depicts a graphic user interface through which a content generator may specify certain areas of a scene and/or representative image to be of higher importance.

Areas that are allocated higher importance are selected when defining an importance function. As shown in FIG. 4, a graphic interface 500 may be provided through which a content generator may specify certain areas of a scene and/or representative image to be of higher importance. The graphic interface 500 depicts to the content generator a sample image from the scene 502 to be rendered. The graphic interface 500 may also include viewpoint controls 504 that permit the content generator to alter its point of view with respect to the scene 502 in some cases. When the point of view into a scene is set, the content generator selects particular areas of the scene to be designated of higher perceptual importance.

Figure 5:
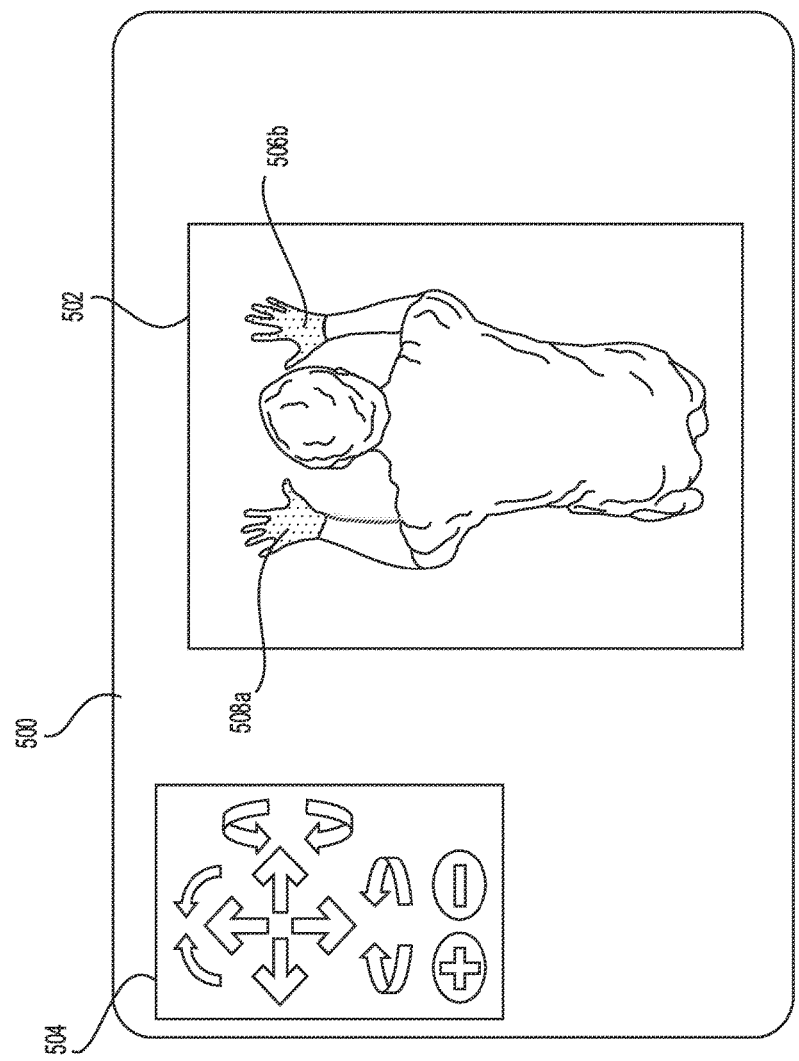
FIG. 5 depicts the graphic user interface of FIG. 4, in which the importance designation by a content generator is applied to the rendered objects or parts of rendered objects in the 3D scene.

For example, the content generator can apply a mask 506a, 506b to the sample scene. The graphic interface 500 may determine the rendered objects or parts of rendered object 508a, 508b, as shown in FIG. 5, from the scene 502 that fall within the masked areas 506a, 506b. Those higher-importance rendered objects 508a, 508b can be given an importance function value that is higher than the remainder of objects in the scene, according to one or more predetermined criteria. Those criteria may include, for example, applying a fixed scalar importance value relative to the undifferentiated areas 508 of the scene. The content generator may also be configured with a capability to specify discrete degrees of importance, and to adjust the values assigned to each degree. The importance function or value thereof for a given portion of the scene 502 is reflected in data that describes the points, edges, faces and/or texels of the higher-importance rendered objects 508a, 508b.

An importance function can also be defined using an automated methodology. Such methodology can reference sample images from the scene to be rendered, including multiple viewpoints of sample scenes. The methodology automatically detects which parts of a subject are contextually important, and assigns them with more weight via an importance function. For example, when the subject is a human, the hands and the face are more contextually or perceptually important, and sensitive to the viewer. Therefore, application of a face detector implemented using, for example, a face detector software development kit (SDK) supported by MICROSOFT® Corporation, can help identify a face represented in the rendered scene in an automated manner not requiring manual input.

Figure 6:
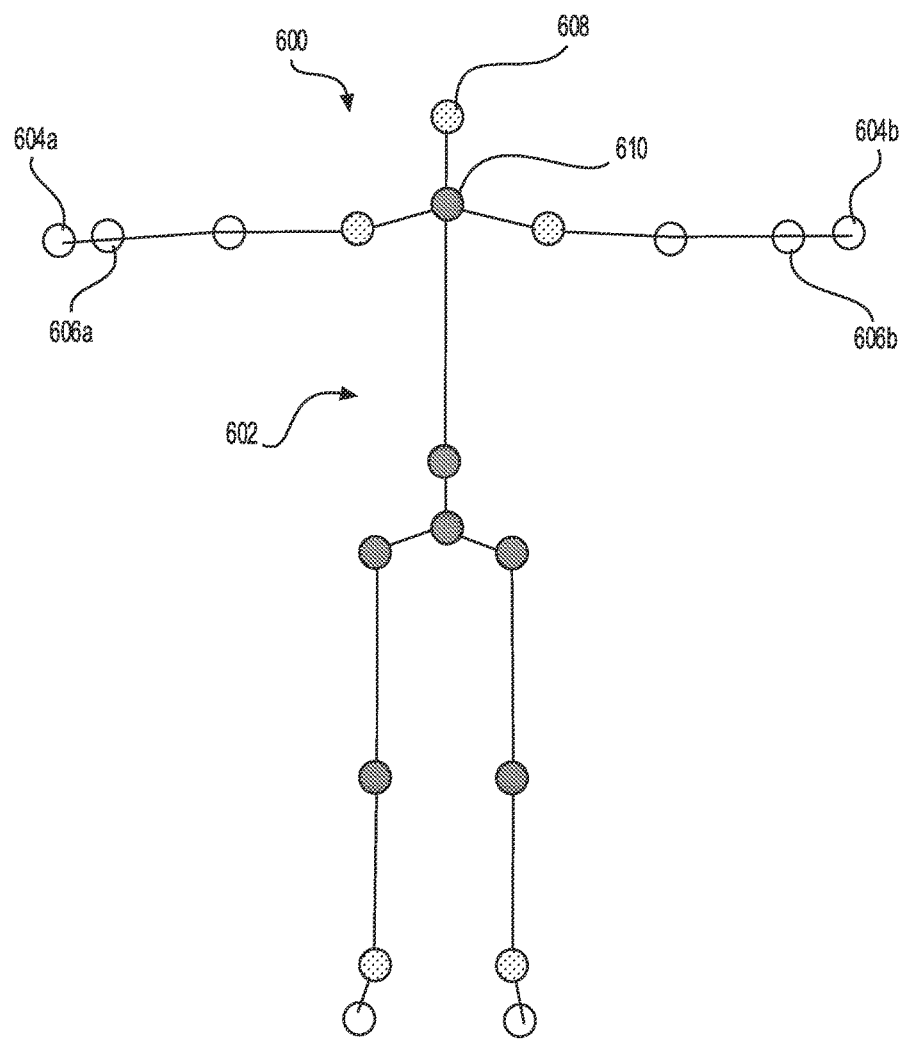
FIG. 6 depicts skeletal tracking in one illustrative example of the present context-adaptive allocation of render model resources.

In certain implementations, a skeletal tracker may be utilized, such as one included in a natural user interface supported by the KINECT™ SDK supported by MICROSOFT® Corporation. The skeletal tracker may detect the position of a skeletal figure 600, as shown in FIG. 6, in an input image, for example such as captured by a video input of a game player 602. The skeletal tracker can typically detect the position of, inter alia, the hands 604a, 604b, the wrists 606a, 606b, the head 608 and shoulders 610 of the skeletal figure. Therefore, the head 608 area above a shoulder center 610 and a hand area 604a, 604b outward from the wrist 606a, 606b can be designated as perceptually important, in accordance with one contextual scheme.

These or other techniques of automated importance identification can be used to help identify and tag perceptually important contextual parts of a scene. Once an importance function is defined, it can be used to adaptively allocate various kinds of rendering resources. In the discussion that follows, a focus on discussing the allocation of polygons and texels is used as an illustrative example. However, the similar idea can be generalized to other cases to intelligently concentrate more resource energy on perceptually important areas.

Figure 7:
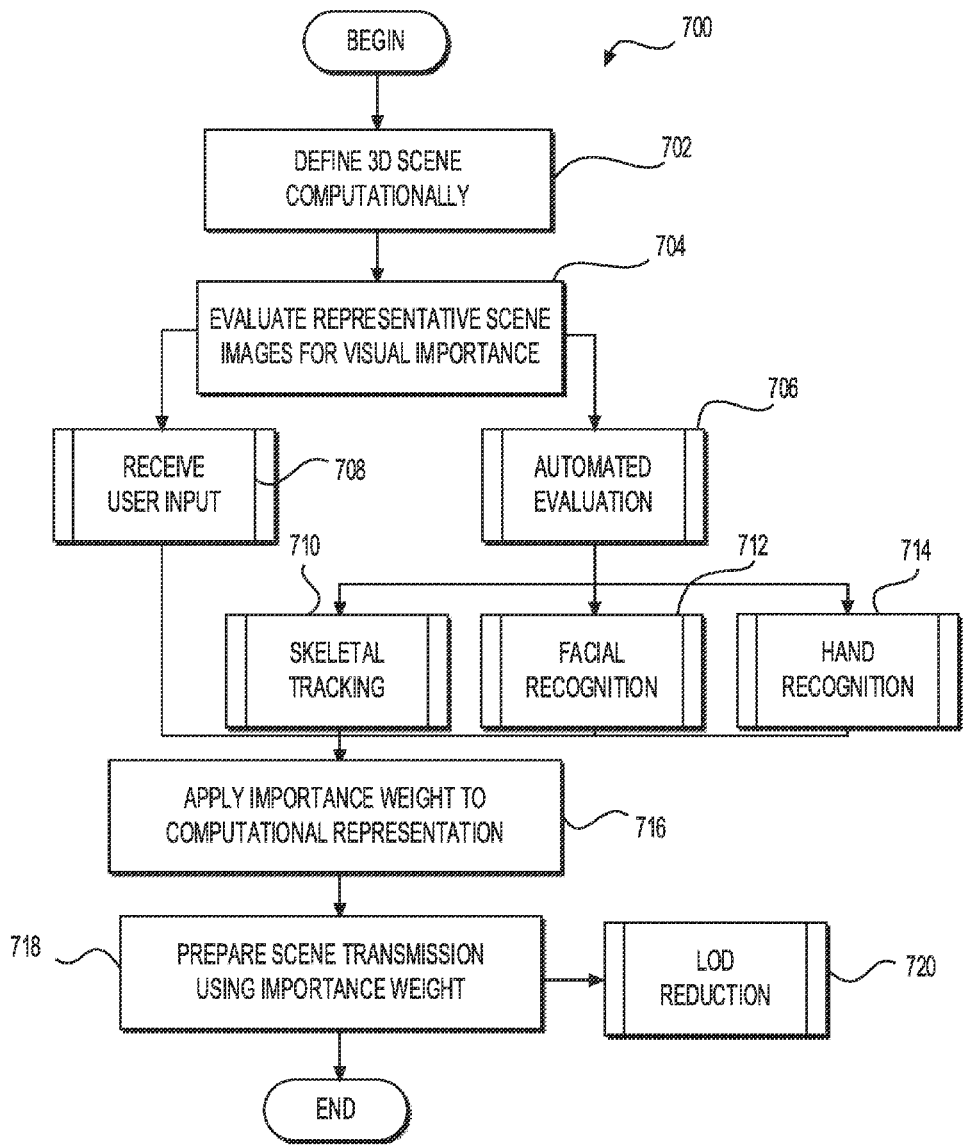
FIG. 7 is a flowchart of an illustrative method for performing context-adaptive allocation of render model resources.

Various illustrative real scenarios in which importance functions may be applied are now presented. FIG. 7 shows a flowchart of an illustrative method 700 for communicating a three-dimensional scene to a rendering device. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In an illustrative example, in step 702 a computational description of a 3D reconstruction of a scene focused around one or more people generated from multiple source images is generated in step 702. It may be considered when rendering a scene including people and/or anthropomorphic characters that the most perceptually important areas are 1) the face, and 2) the hands. The discussion that follows includes an automated method to detect and tag this information from the multiple source images that may be used to generate the 3D reconstruction, and further includes how a mechanism may be provided to allow for user editing of importance functions if the automatic detection produces erroneous results.

Note that the detection of face and hands is intended as an illustrative example of encoding contextual information into an importance function. There exist multiple other possibilities that would be beneficial for importance functions, such as using a skeleton tracker to know the whole body motion of a subject. A content generator could also assign different weights according to different body parts given by the skeleton tracker. In still other implementations, for example only, and without limitation, the predetermined visual elements of elevated visual importance may include a predetermined text element, a predetermined graphic element, or a known part or whole of a subject of interest. In some implementations, other feature detectors may be employed to find, for example, a graphic advertisement, a graphic logo, such as in an advertisement, a merchandise sample, or detect other features such as hair or different materials. The detected features are designated for more accurate depiction. Those features that are considered visually or perceptually important are emphasized, and those that are not are de-emphasized.

In another implementation of the presently disclosed principles, certain other visual elements are identifiable as important. For example only, and without limitation, edge definition and geometric patterns appearing within the scene may be important to visual fidelity of reproduction. An object may be defined by straight or well-defined curving edges. In that case, shifting of points and edges during mesh decimation may decrease the linearity of certain edges, or introduce irregularities in certain curving features. Therefore, identification of these geometric features present in the 3D scene may be a component of the importance function.

An evaluation of the 3D scene is performed, in step 704, to detect predetermined items of particular perceptual importance, in this case hands and face. At least a portion of this process includes an automated evaluation, in step 706. Where, as in the embodiment under discussion, hands and head (or face) are areas of interest, a skeletal tracking 710, described above, can be employed to identify hands and head.

In another embodiment, the automated evaluation includes facial detection or recognition, step 712. Various known face detection techniques may be utilized. For example, the Viola-Jones object detection framework is particularly adapted for face detection. As a first approximation to the importance function, the VJ face detection technique is executed on multiple scales and orientations of the rendered scene, to ensure that any potential face(s) in each image are captured and identified. The output of the VJ face detection technique is a set of rectangles, one for each detected image.

Figure 8:
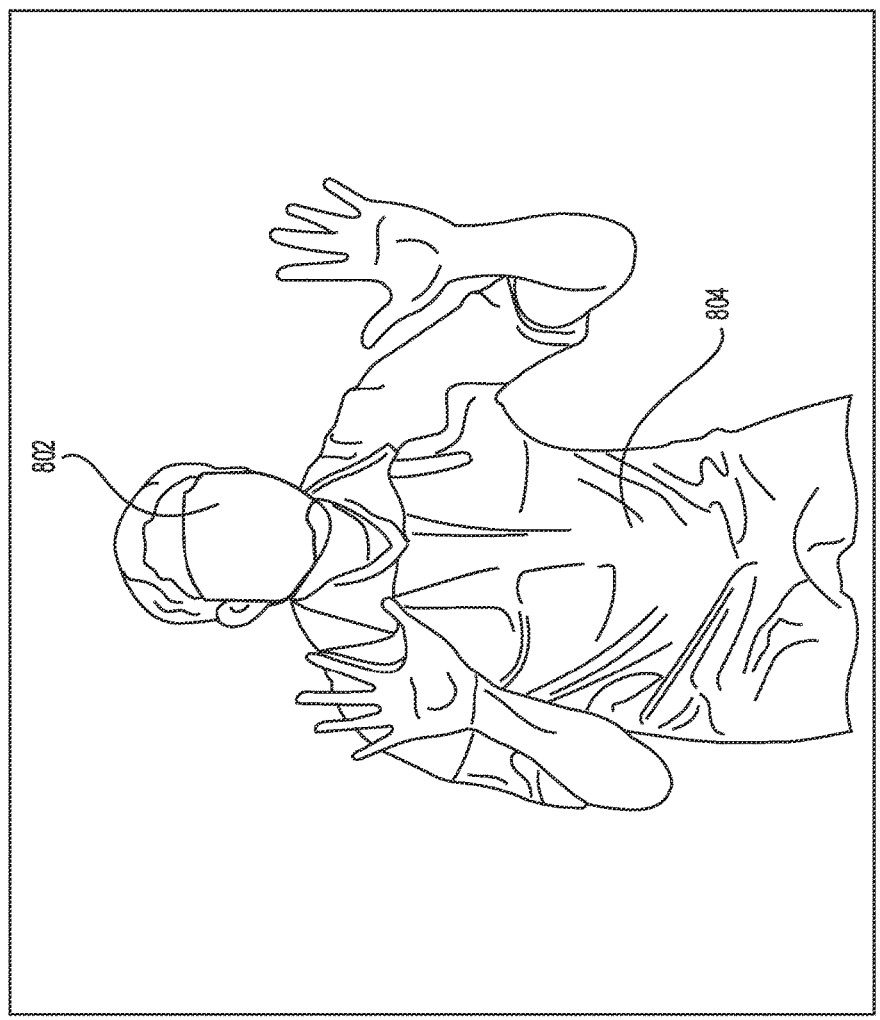
FIG. 8 shows a result of an illustrative automated face detection methodology as applied to a representative 3D scene including a human figure.

The automated face detection can be performed upon multiple images of the scene. To unify the face detection information from each camera position within the given scene, a simple voting-based technique is performed, leveraging a priori knowledge of the scene. That is, from the 3D reconstruction, the content generator has information about the scene geometry (mesh) and the camera positions. Projecting the mesh into each image, one vote is cast for each vertex that falls inside a rectangle that includes a detected face. The result is a mesh in which each vertex contains a certain number of votes, which is an approximation of the probability that a vertex is part of a face. In one particular implementation, a minimum threshold vote count to consider a particular vertex as part of a face may be the median of the vote counts across all vertices. The histogram of votes is modeled as a Gaussian distribution, and all votes within one standard deviation of the mean of the distribution are considered valid. Vertices not reaching the minimum vote count are considered "low importance", while vertices over the minimum vote count are considered "high importance" as corresponding with a face. Consider, the example depicted in FIG. 8. Using face detection on forty (40) source images of the subject, and performing the voting scheme described above, achieved a result in which the area 802 depicts a "high importance" area and areas 804 depict "low importance" areas.

In certain implementations, different areas can be detected and assigned different weights depending on the relative importance of each area. For example, a simple skin/hand detection methodology to improve detail in rendering a person's hands, at the expense of other areas, may improve the overall perceived quality of the final 3D rendering. One such method of identifying hands, which may also be termed hand recognition or hand tracking, step 714 in FIG. 7, is described below.

The information that results from the face detection methodology and voting scheme discussed above can be described as an annotated mesh containing "face" vertices or higher-importance vertices, and "non-face" or lower-importance vertices. By projecting back the mesh into each image, the area that contains face pixels in each image is identified. With this information, a color model distribution for skin tones for this particular depicted individual is discernable. For example, a Gaussian Mixture Model (GMM) can be learned for the pixels corresponding to the area designated as "face", such as described by C. Rother, V. Kolmogorov and A. Blake (2004). GrabCut—Interactive Foreground Extraction using Iterated Graph Cuts. ACM Trans. Graphics (SIGGRAPH), 309314. This technique provides one GMM for the skin color and one for the background. For the skin color model, colors from the face are sampled, and for the background color model, colors from any area other than the face ae sampled. In one particular test, 100,000 pixels from the face and 100,000 pixels from non-face areas were sampled to build each color model.

Figure 9C:
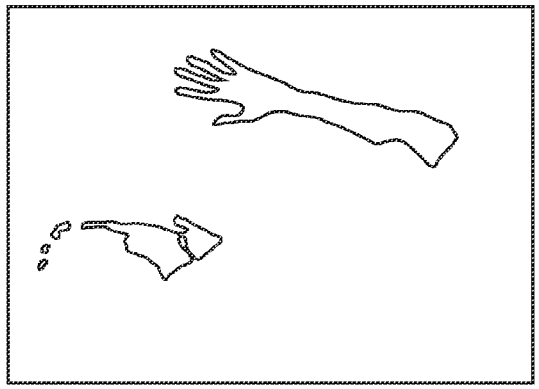
FIGS. 9A, 9B, and 9C show representative images resulting from application of an illustrative skin detection methodology.
Figure 9B:
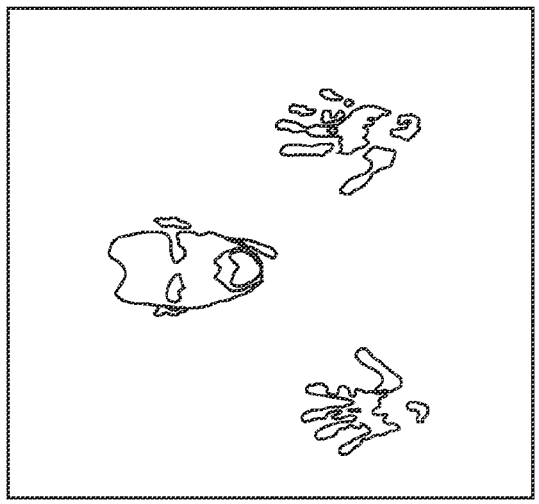
Figure 9A:
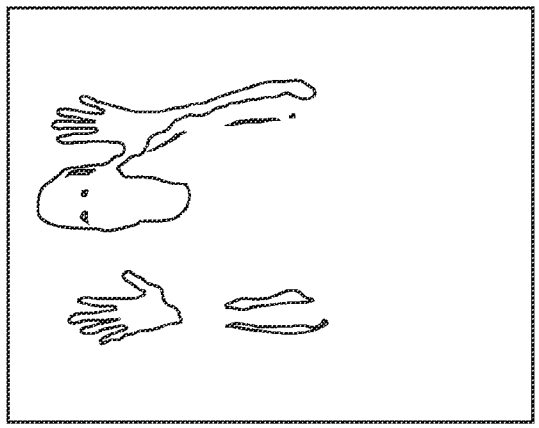

Once the GMM models for skin/background are determined, both models are tested on every pixel of every image, and which correspondence is greatest is compared—skin/face or background—to determine whether a pixel is part of the skin or not. FIGS. 9A, 9B, and 9C show multiple images after running this skin detector, with white depicting skin color and black depicting non-skin color.

Figure 10:
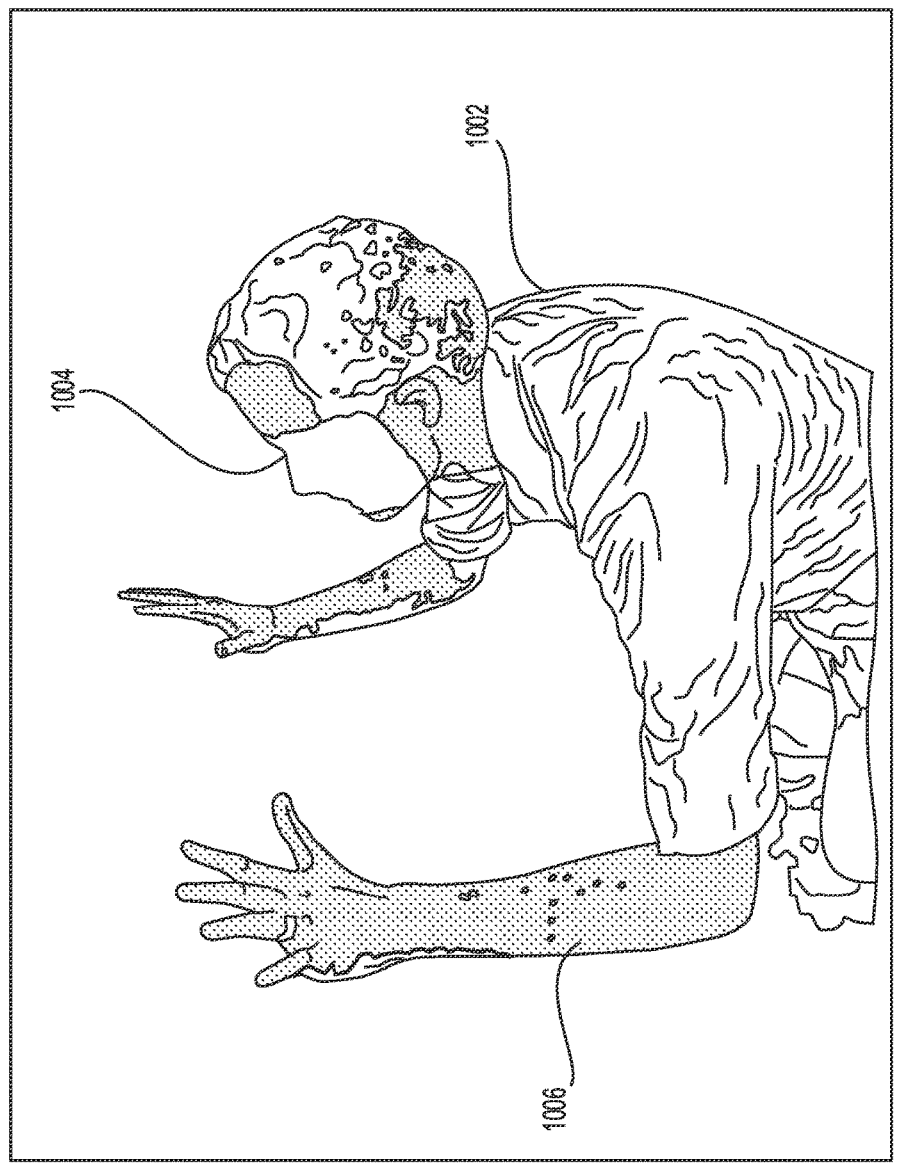
FIG. 10 depicts a human figure in a 3D scene, including shading that indicates three levels of perceptual importance in the human figure depiction.

To consolidate the results from multiple images, the same voting-based methodology described before for face detection is executed on these images, where one vote is cast to every vertex that falls inside a skin-colored pixel. After the importance evaluation process in step 704, the importance is applied to the definition of the scene, in step 718 in FIG. 7. In this case, the output mesh is annotated to contain different weights for the face and the skin areas. In the example depicted in FIG. 10, the person 1002 is shaded so that the vertices in the darker area 1004 depict the face (i.e., "high importance"), the lighter shading 1006 of vertices such as on the arms and hands depict other skin areas (i.e., "mid importance"), and any residual vertices in other areas are considered "low importance". In another implementation of the presently disclosed principles, the multiple images of the 3D scene include variation in point of view, i.e., spatial variation. The multiple images may also be taken from different points in time with a given scene, i.e., temporal variation.

The automatic methods of visual importance evaluation, in step 706 in FIG. 7, can be combined and/or augmented with user input, in step 708, for example if the automated evaluation in step 706 is inadequate and/or incomplete. A simple modification to the voting scheme described previously may typically be enough to support this case. Consider the case of a user mask in one or more of the input images, so that it contains three potential types of information: "this area is not important", "this area is unknown—let the automated evaluation decide", and "this area is important". These three types can be readily encoded into a range [0, 255] that can be saved as a regular grayscale image. For example, encode "unknown" as value 0, and any value higher than 0 would be the actual importance weight, from "not important" for a value of 1 to "very important" for a value of 255.

With such user input, the methodology can proceed to run automatically to annotate the mesh with automatically computed importance weights. Thereafter, if the user input is "unknown", the automatically determined weight stays the same. If the user input provides a specific weight, overwrite the automatic weight with the user-specified weight. In the case where multiple user inputs in different images correspond to a single vertex of the mesh, the weight may be set as some combination of the different user inputs from the various views (e.g., an average or a median).

The next steps involve adaptive allocation of polygons by applying the importance weights for the various visual elements of the 3D scene to the computational representation, in step 716, and using the importance function information to prepare the computational description for communication to the rendering device, in step 718. In some implementations, preparing the computational description for communication to the rendering device may include reducing the level of detail (LOD) in the computational description, in step 720.

Moreover, in certain embodiments or implementations, such as those described above which account for the definition of geometric patterns in the scene, those patterns and characteristics can also be preserved during the LOD reduction. For example, where a straight line is sought to be maintained, the ability or propensity of associated points and/or edges to vary from strictly linear can be restricted during the reduction of LOD, and the resulting relocation of points and/or edges. Similarly, in those implementations where the importance weight is connected with a constant or defined curvature, the ability or propensity of associated points and/or edges to vary from the defined form is likewise restricted.

Figure 11:
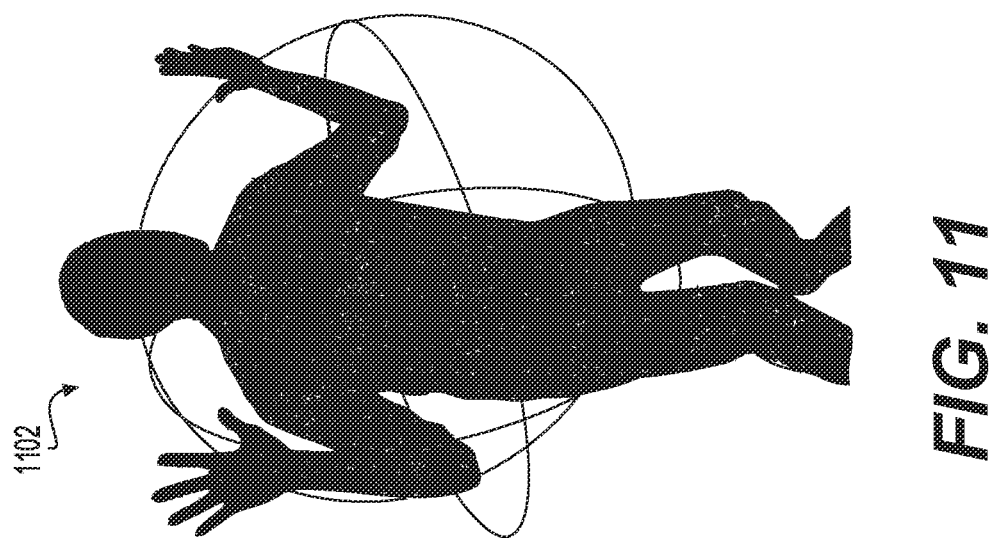
FIG. 11 shows a high-resolution mesh of a human figure in a 3D scene.

As described above, as polygons increase in density on a surface patch, the more accurately it is represented. Here, a goal is to maximize the perceptual quality of the rendered 3D object. Consider a high-resolution mesh of a human FIG. 1102, as shown in FIG. 11 that is downsampled for streaming in accordance with a polygon budget. To remove triangles adaptively, an importance function is first executed on the mesh using, for example, one or more of the methods described above, to specify that the face and one of the hands are more perceptually important than the rest of the subject. The result of this process is visible in FIG. 12, including a detected face area 1202, and a detected hand area 1204.

The mesh may then decimated using a variant of the Quadric Error Metric (QEM) approach described in Hugues Hoppe, "New quadric metric for simplifying meshes with appearance attributes", IEEE Visualization 1999 Conference, pp. 59-66. In particular, the per-vertex QEM terms are scaled based on importance weights of vertices. Thus, the higher the importance weight a vertex has, the less likely it gets deleted during the simplification. In this example, the face area 1202 was given a weight of 100, the skin and hand area 1204 was given a weight of 25, and the rest of the body was given a weight of 1.

Figure 12:
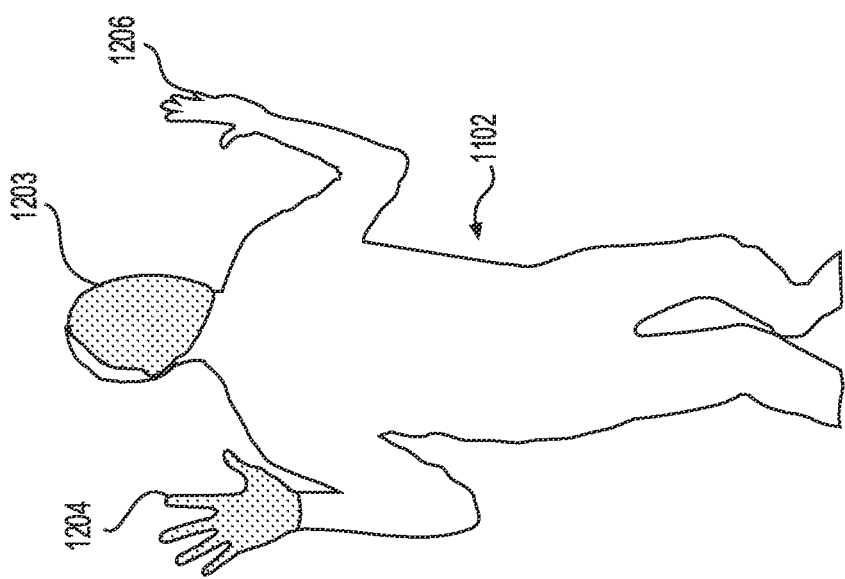
FIG. 12 shows the human figure of FIG. 11, including shading that indicates three levels of perceptual importance in the human figure depiction.
Figure 13:
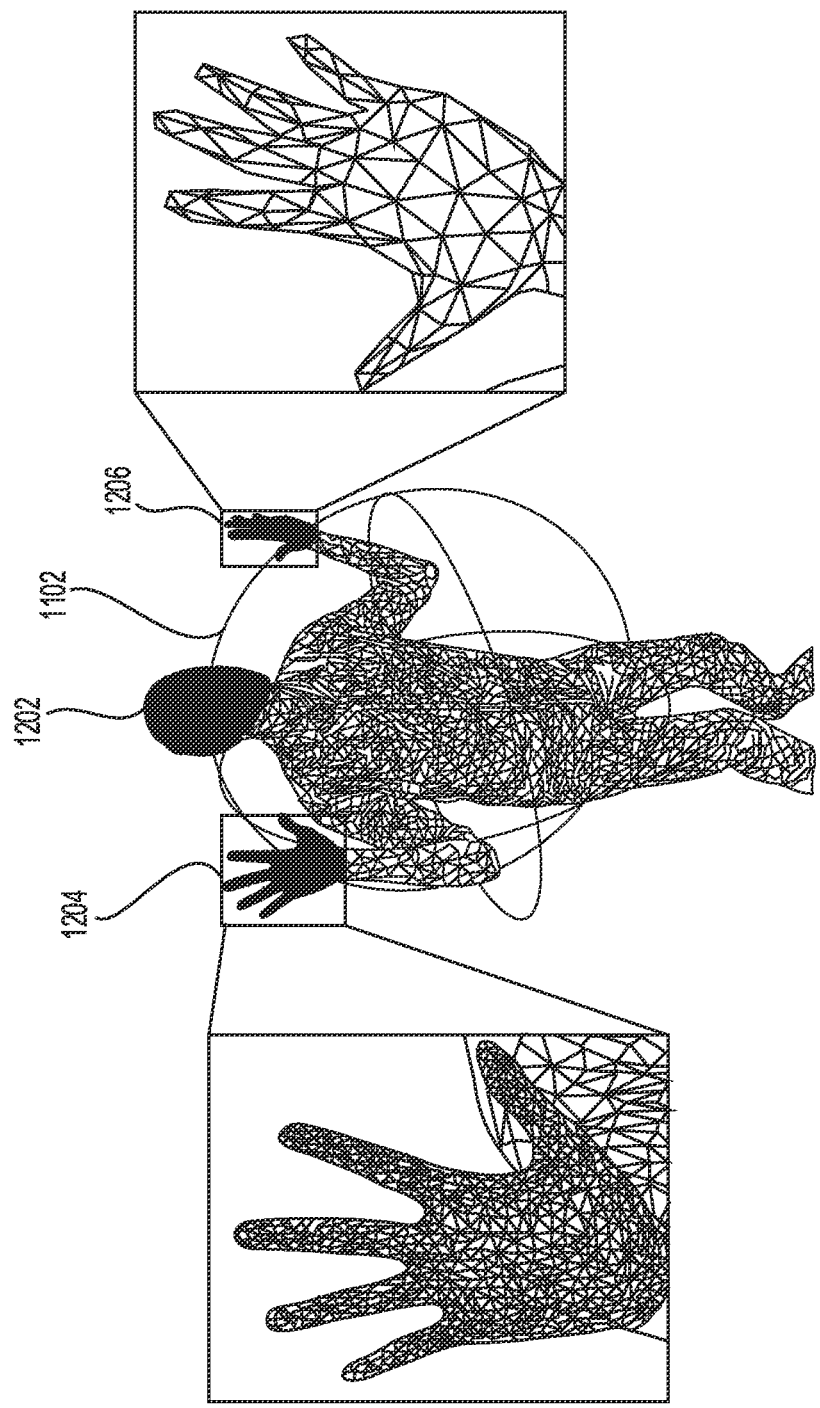
FIG. 13 shows the human figure of FIG. 12 after reduction of mesh detail.

In particular, consider that in the example shown in FIG. 12, only one of the subject's hands, the right, was marked as important. The subject's left hand 1206 was given the same importance as the rest of the body. FIG. 13 shows the subject's right hand 1204 and left hand 1206, after decimation of the mesh. The greater density of the mesh in the right hand 1204 results in a more visually faithful reproduction. Moreover, the enhanced emphasis in fidelity of the hand 1204 and face 1202 improves the visual effect of the entire scene notwithstanding the resource budget constraint.

Figure 14B:
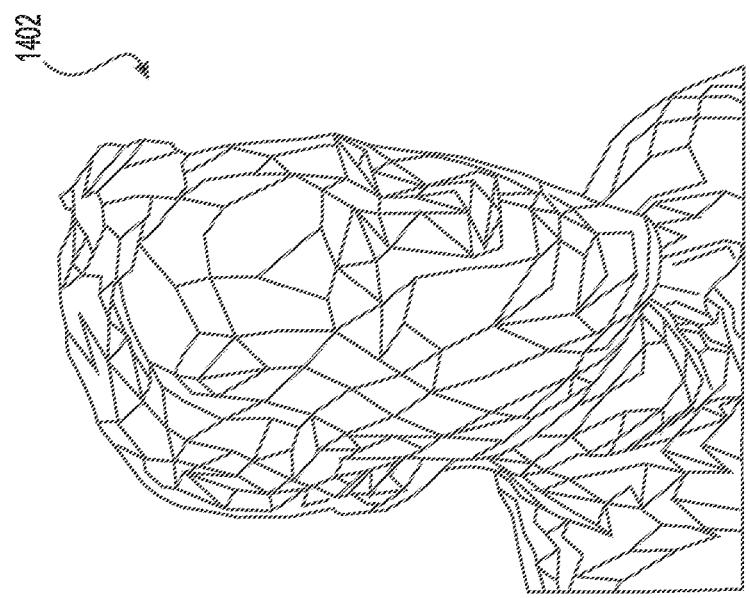
FIG. 14B shows an illustrative face geometry of a wire mesh reduced in detail uniformly with the entire 3D scene of which it was a part.
Figure 14A:
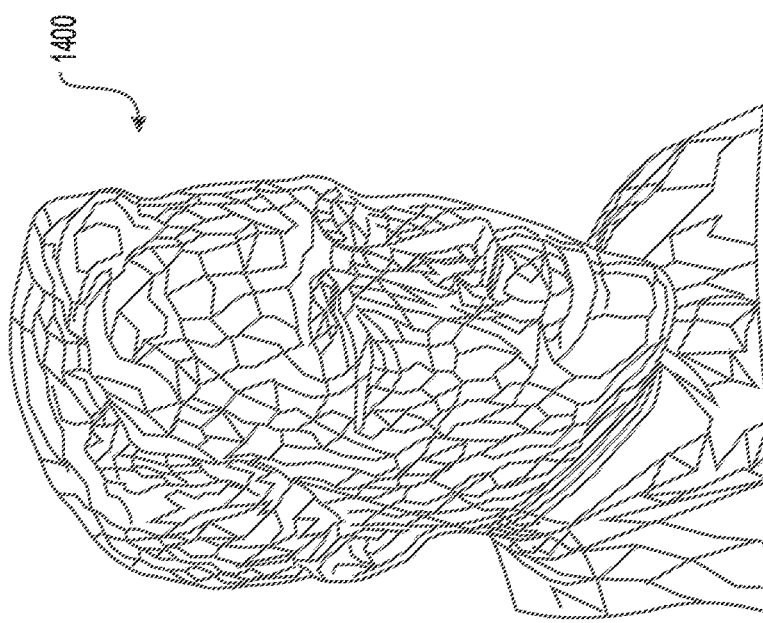
FIG. 14A shows an illustrative face geometry of a wire mesh reduced in detail.

As another comparison, FIG. 14A shows the face geometry 1400 resulting from the above described adaptive allocation approach. On the other hand, by comparison, FIG. 14B shows an alternative face mesh 1402, which represents what the face mesh would have looked like if triangles were decimated uniformly, using the same density of triangles on the entire subject.

Texels may also be adaptively allocated. Texture mapping is generally a ubiquitous method for adding surface details (such as colors, normals, and the like) onto a mesh. The surface is first parameterized and unwrapped to a 2D domain (using, for example, MICROSOFT®'s UVAtlas library). The associated details are then encoded as texels written into an image.

Using the present techniques, without specifying preferences, perceptually important areas such as human faces may be described by the same density of texels as any other parts of the surface. However, by leveraging an importance function, texel resolutions and/or density can be automatically increased for perceptually significant areas.

Consider an approach that is an extension of the present state of UVAtlas. Present techniques permit a content generator to specify a custom Integrated Metric Tensor (IMT) on a per-triangle basis. For each triangle, IMT is a 2×2 positive-definite matrix and defines the inner-product used for computing distances on the surface. Intuitively, the larger a triangle's IMT is, the greater area it will be allocated during the unwrapping. Thus, after computing initial IMTs based on the surface's embedding, these IMTs may be readily scaled using the importance weights. Alternatively, the content generator may designate the IMT of each triangle in the texture map as an identity matrix, multiplied by its respective area and importance weight. This latter approach may result in artifacts, yet it may be simpler to implement.

In this case, it is considered that the importance weight of a given texel can be inferred from that of the underlying nodes, the importance value of which may be discerned by one of the above-described methods. Where one or more nodes underlies a given texel, some combination of the node importance values may be used, such as a mean or median importance value. As a cautious technique, to prevent loss of detail, it may be determined that a texel is given the highest importance value of any node it overlies or is adjacent to. Conversely, to most aggressively conform to a resource budget, a texel may be given the lowest importance value of any node it overlies or is adjacent to. The choice will be within the discretion of the content generator.

In some implementations, the above described methods of determining an importance value of a particular node may be independently applied to a texture map. These methods include the process of facial recognition, skin tone discovery, and/or user-directed input from a content generator, such as via graphic interface, or some combination thereof In still another implementation of the presently disclosed principles, an importance weight may be applied to a coordinate that describes one or more faces 106, 406, of a wire mesh 100, 400. For example the coordinate may lie within the boundaries of the face 106, 406, or it may lie on either an edge 104, 404 or a node 102, 402 that defines the boundaries of the face 106, 406. In that case, a face 106, 406 that is designated with an importance weight by its respective coordinate location is less likely to be removed from the mesh during a downsampling or reduction in level of detail than a face having a lower importance weight.

In the prior discussion, scenarios were described in which the main representation of a 3D object consists of a triangle mesh and a texture map. It is emphasized, however, that the present approach may be general enough for application to various kinds of representations for other surfaces. For example, when a surface is represented as a subdivision/B-spline surface (See, e.g., Catmull & Clark, Recursively Generated B-Spline Surfaces on Arbitrary Topological Meshes, Proceedings of Computer-Aided Design, Vol. 10, No. 6, pp. 350-55 (1978)), the importance function can be used to drive the number of refinement iterations adaptively.

When a surface is represented by a voxel-based volumetric representation (See, e.g., Chen, et al., Scalable Real-Time Volumetric Surface Reconstruction, Proceedings of ACM Transactions on Graphics, Vol. 32, No. 4 (2013)), the importance function can be used to drive the voxel resolution, by analogous extension from the description herein of mesh density preservation in areas of elevated importance, and/or texel preservation. That is, voxel resolution is preserved in areas of elevated importance, while it is reduced in areas of relatively lower perceptual importance.

In addition, when a surface is represented using point set surfaces (See, e.g., Alexa, et al., Point Set Surfaces, Proceedings of the conference on Visualization, (2001)), the importance function can be used to drive the (re-) sampling density. When a surface is represented by quads, tetrahedrons, or general polygons, the importance function can be used to drive their decimation, similar to what is described above for mesh triangles. Considering further recent advances in geometry and tessellation shaders (See, e.g., Neisser, et al., Feature-Adaptive GPU Rendering of Catmull-Clark Subdivision Surfaces, Journal ACM Transactions on Graphics, Vol. 31, No. 1 (2012)), the importance function can also be used at runtime to drive the resolution of surface displacement.

Figure 15:
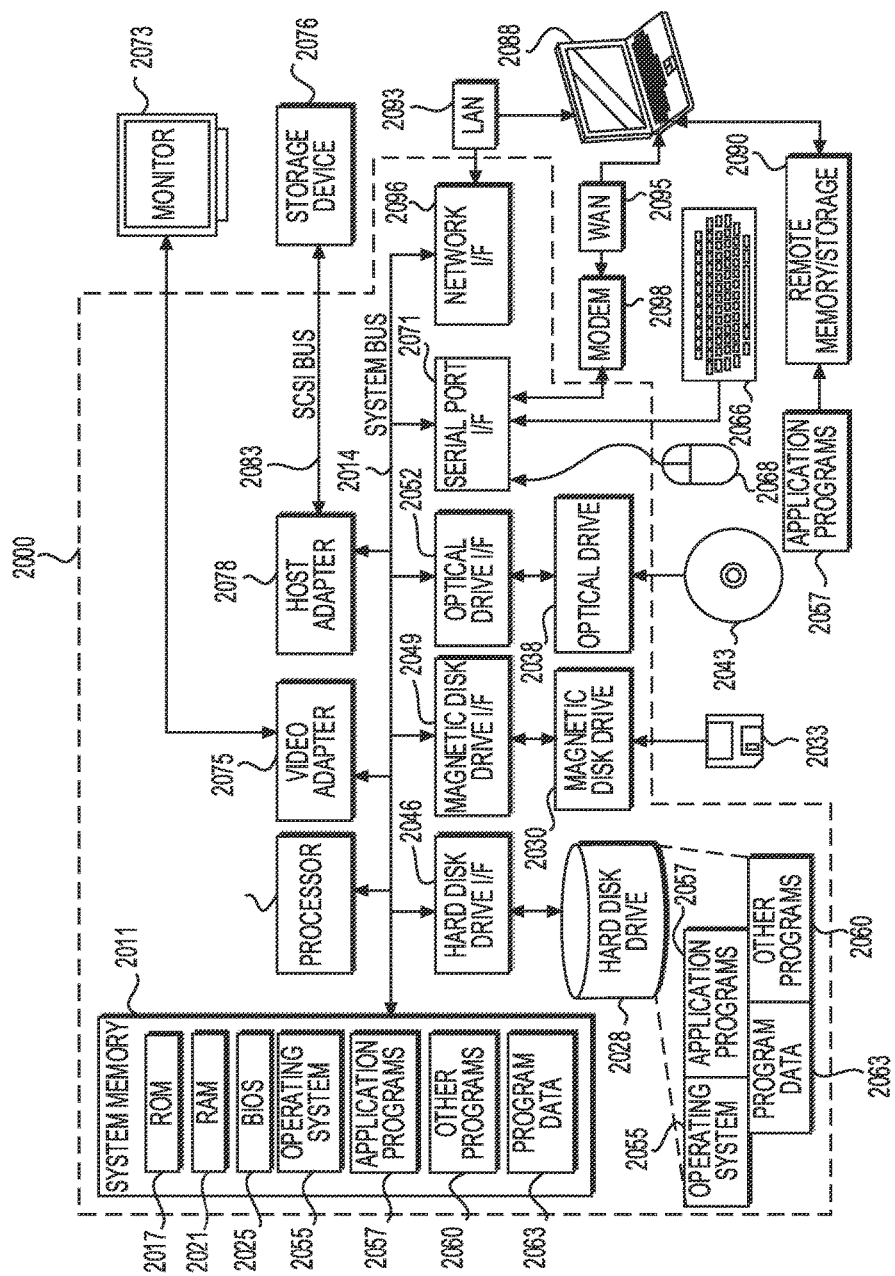
FIG. 15 is a simplified block diagram of an illustrative computer system such as a personal computer (PC) or server that may be used in part to implement the present context-adaptive allocation of render model resources.

FIG. 15 is a simplified block diagram of an illustrative computer system 2000 such as a personal computer (PC), client device, or server with which the present context-adaptive allocation of render model resources may be implemented. Computer system 2000 includes a processing unit 2005, a system memory 2011, and a system bus 2014 that couples various system components including the system memory 2011 to the processing unit 2005. The system bus

2014 may be any of several types of bus structures including a memory bus or memory controller, a peripheral bus, and a local bus using any of a variety of bus architectures. The system memory 2011 includes read only memory ("ROM") 2017 and random access memory ("RAM") 2021. A basic input/output system ("BIOS") 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer readable storage media provide non-volatile storage of computer readable instructions, data structures, program modules, and other data for the computer system 2000. Although this illustrative example shows a hard disk, a removable magnetic disk 2033, and a removable optical disk 2043, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present context-adaptive allocation of render model resources. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 2005 through a serial port interface 2071 that is coupled to the system bus 2014, but may be connected by other interfaces, such as a parallel port, game port, or USB. A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 15 also includes a host adapter 2078, a Small Computer System Interface ("SCSI") bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 15. The logical connections depicted in FIG. 15 include a local area network ("LAN") 2093 and a wide area network ("WAN") 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 15 are illustrative and other means of establishing a communications link between the computers may be used depending on the specific requirements of an application of the present context-adaptive allocation of render model resources. It may be desirable and/or advantageous to enable other types of computing platforms other than the server 19 to implement the present context-adaptive allocation of render model resources in some applications.

Figure 16:
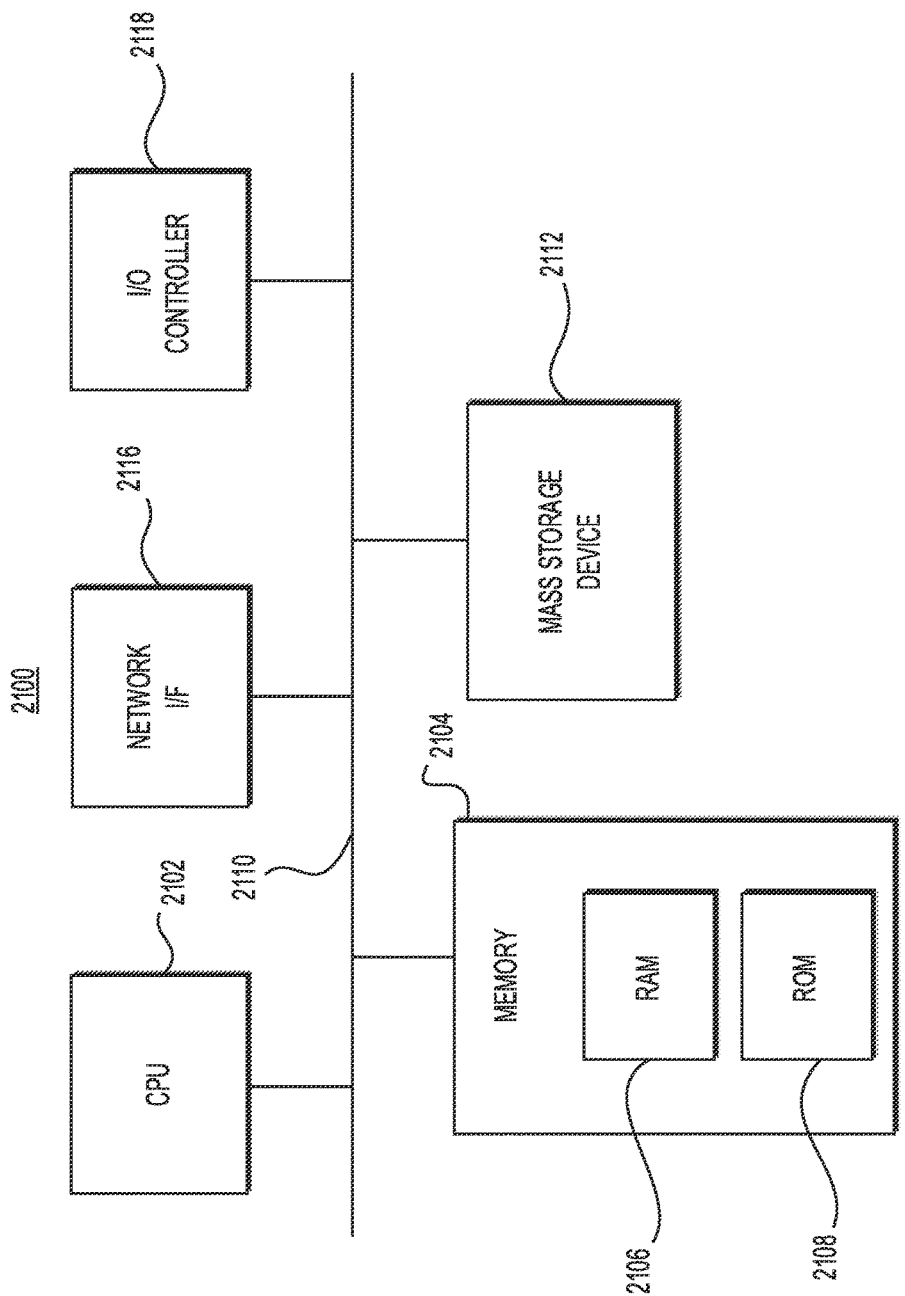
FIG. 16 shows a block diagram of an illustrative computing platform that may be used in part to implement the present context-adaptive allocation of render model resources.

FIG. 16 shows an illustrative architecture 2100 for a device capable of executing the various components described herein for providing the present context-adaptive allocation of render model resources. Thus, the architecture 2100 illustrated in FIG. 16 shows an architecture that may be adapted for a server computer, mobile phone, a PDA, a smartphone, a desktop computer, a netbook computer, a tablet computer, GPS device, multimedia gaming console, and/or a laptop computer. The architecture 2100 may be utilized to execute any aspect of the components presented herein.

The architecture 2100 illustrated in FIG. 16 includes a CPU (Central Processing Unit) 2102, a system memory 2104, including a RAM 2106 and a ROM 2108, and a system bus 2110 that couples the memory 2104 to the CPU 2102. A basic input/output system containing the basic routines that help to transfer information between elements within the architecture 2100, such as during startup, is stored in the ROM 2108. The architecture 2100 further includes a mass storage device 2112 for storing software code or other computer-executed code that is utilized to implement applications, the file system, and the operating system.

The mass storage device 2112 is connected to the CPU 2102 through a mass storage controller (not shown) connected to the bus 2110. The mass storage device 2112 and its associated computer-readable storage media provide non-volatile storage for the architecture 2100. Although the description of computer-readable storage media contained herein refers to a mass storage device, such as a hard disk or CD-ROM drive, it may be appreciated by those skilled in the art that computer-readable storage media can be any available storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It may be appreciated that the network interface unit 2116 also may be utilized to connect to other types of networks and remote computer systems. The architecture 2100 also may include an input/output controller 2118 for receiving and processing input from a number of other devices, including a keyboard, mouse, or electronic stylus (not shown in FIG. 16). Similarly, the input/output controller 2118 may provide output to a display screen, a printer, or other type of output device (also not shown in FIG. 16).

It may be appreciated that the software components described herein may, when loaded into the CPU 2102 and executed, transform the CPU 2102 and the overall architecture 2100 from a general-purpose computing system into a special-purpose computing system customized to facilitate the functionality presented herein. The CPU 2102 may be constructed from any number of transistors or other discrete circuit elements, which may individually or collectively assume any number of states. More specifically, the CPU 2102 may operate as a finite-state machine, in response to executable instructions contained within the software modules disclosed herein. These computer-executable instructions may transform the CPU 2102 by specifying how the CPU 2102 transitions between states, thereby transforming the transistors or other discrete hardware elements constituting the CPU 2102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2100 in order to store and execute the software components presented herein. It may also be appreciated that the architecture 2100 may include other types of computing devices, including handheld computers, embedded computer systems, smartphones, PDAs, and other types of computing devices known to those skilled in the art. It is also contemplated that the architecture 2100 may not include all of the components shown in FIG. 16, may include other components that are not explicitly shown in FIG. 16, or may utilize an architecture completely different from that shown in FIG. 16.

Figure 17:
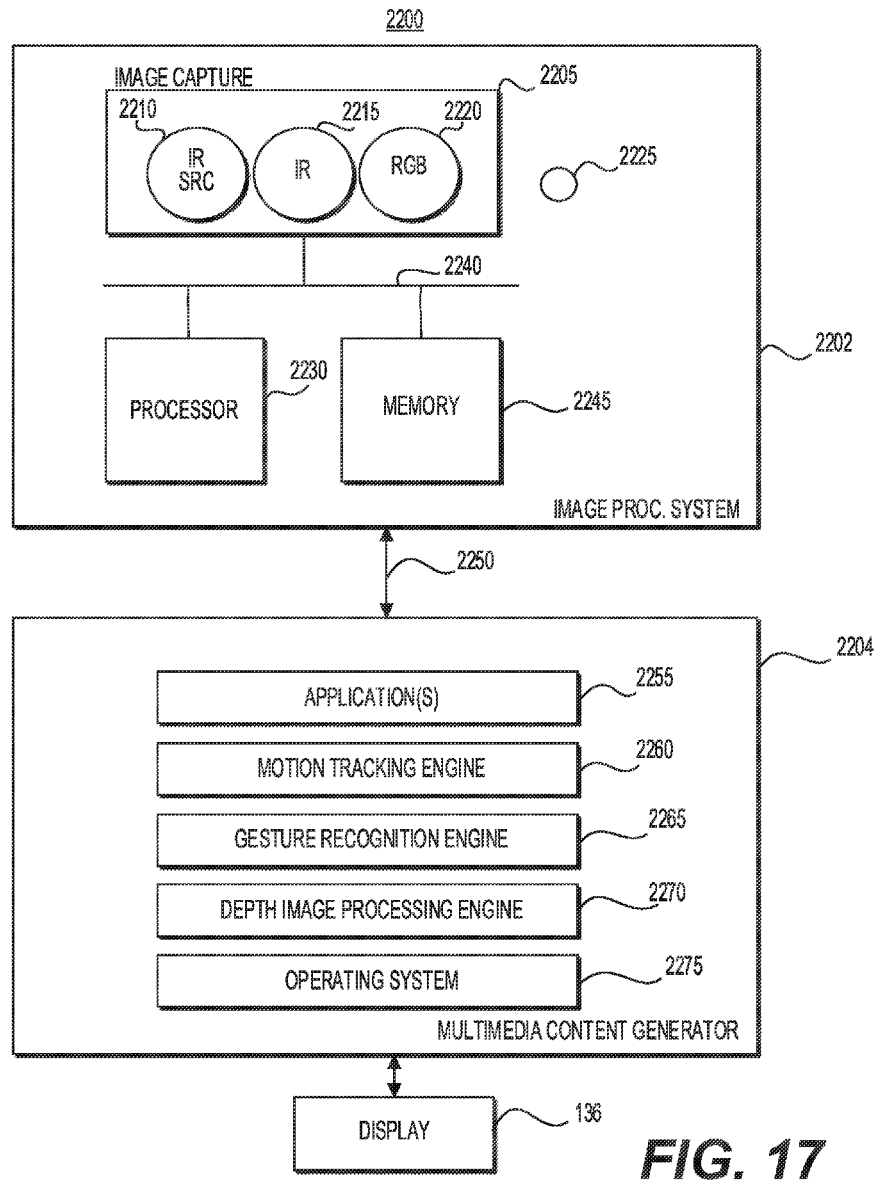
FIG. 17 shows a functional block diagram of an illustrative camera system that may be used in part to implement the present context-adaptive allocation of render model resources.

FIG. 17 shows illustrative functional components of an image processing system 2202 and multimedia content generator 2204 that may be used to recognize human and anthropomorphic images in a three-dimensional scene. The image processing system 2202 may be configured to capture video with depth information including a depth image that may include depth values via any suitable technique including, for example, time-of-flight, structured light, stereo image, or the like. In some implementations, the image processing system 2202 may organize the calculated depth information into "Z layers," or layers that may be perpendicular to a Z-axis extending from the depth camera along its line of sight.

As shown in FIG. 17, the image processing system 2202 includes an image capture component 2205. The image capture component 2205 may be configured to operate as a depth camera that may capture a depth image of a scene. The depth image may include a two-dimensional ("2D") pixel area of the captured scene where each pixel in the 2D pixel area may represent a depth value such as a distance in, for example, centimeters, millimeters, or the like of an object in the captured scene from the camera. In this example, the image capture component 2205 includes an IR light component 2210, an IR camera 2215, and a visible light RGB camera 2220 that may be configured in an array, as shown, or in an alternative geometry.

Various techniques may be utilized to capture depth video frames. For example, in time-of-flight analysis, the IR light component 2210 of the image processing system 2202 may emit an infrared light onto the capture area and may then detect the backscattered light from the surface of one or more targets and objects in the capture area using, for example, the IR camera 2215 and/or the RGB camera 2220. In some embodiments, pulsed infrared light may be used such that the time between an outgoing light pulse and a corresponding incoming light pulse may be measured and used to determine a physical distance from the image processing system 2202 to a particular location on the targets or objects in the capture area. Additionally, the phase of the outgoing light wave may be compared to the phase of the incoming light wave to determine a phase shift. The phase shift may then be used to determine a physical distance from the camera system to a particular location on the targets or objects. Time-of-flight analysis may be used to indirectly determine a physical distance from the image processing system 2202 to a particular location on the targets or objects by analyzing the intensity of the reflected beam of light over time via various techniques including, for example, shuttered light pulse imaging.

In other implementations, the image processing system 2202 may use structured light to capture depth information. In such an analysis, patterned light (i.e., light displayed as a known pattern such as a grid pattern or a stripe pattern) may be projected onto the capture area via, for example, the IR light component 2210. Upon striking the surface of one or more targets or objects in the capture area, the pattern may become deformed in response. Such a deformation of the pattern may be captured by, for example, the IR camera 2215 and/or the RGB camera 2220 and may then be analyzed to determine a physical distance from the camera system to a particular location on the targets or objects.

The image processing system 2202 may utilize two or more physically separated cameras that may view a capture area from different angles, to obtain visual stereo data that may be resolved to generate depth information. Other types of depth image arrangements using single or multiple cameras can also be used to create a depth image. The image processing system 2202 may further include a microphone 2225. The microphone 2225 may include a transducer or sensor that may receive and convert sound into an electrical signal. The microphone 2225 may be used to reduce feedback between the image processing system 2202 and the multimedia content generator 2204 in a target recognition, analysis, and tracking system 2200. Additionally, the microphone 2225 may be used to receive audio signals that may also be provided by the viewer 10 to control applications such as game applications, non-game applications, or the like that may be executed by the multimedia content generator 2204.

The image processing system 2202 may further include a processor 2230 that may be in operative communication with the image capture component 2205 over a bus 2240. The processor 2230 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The image processing system 2202 may further include a memory component 2245 that may store the instructions that may be executed by the processor 2230, images or frames of images captured by the cameras, user profiles or any other suitable information, images, or the like. According to one example, the memory component 2245 may include RAM, ROM, cache, Flash memory, a hard disk, or any other suitable storage component. As shown in FIG. 17, the memory component 2245 may be a separate component in communication with the image capture component 2205 and the processor 2230. Alternatively, the memory component 2245 may be integrated into the processor 2230 and/or the image capture component 2205. In one embodiment, some or all of the components of the image processing system 2202 are located in a single housing.

The image processing system 2202 and particularly image capture component 2205 described above are with reference to the acquisition of images taken from a physical environment. According to another embodiment, the image capture component 2205 and/or image processing system 2202 are configured to receive a computational description of a three-dimensional scene to be rendered, and/or image data describing images of that three-dimensional scene. In that case, the computational description will include, and/or the derived image data can be made to include a priori depth information. For each image of the three-dimensional scene, the underlying depth information can be conveniently organized as a depth image for further processing as described herein.

The image processing system 2202 operatively communicates with the multimedia content generator 2204 over a communication link 2250. The communication link 2250 may be a wired connection including, for example, a USB (Universal Serial Bus) connection, a Firewire connection, an Ethernet cable connection, or the like and/or a wireless connection such as a wireless IEEE 802.11 connection. The multimedia content generator 2204 can provide a clock to the image processing system 2202 that may be used to determine when to capture, for example, a scene via the communication link 2250. The image processing system 2202 may provide the depth information and images captured by, for example, the IR camera 2215 and/or the RGB camera 2220, including a skeletal model and/or facial tracking model that may be generated by the image processing system 2202, to the multimedia content generator 2204 via the communication link 2250. The multimedia content generator 2204 may then use the skeletal and/or facial tracking models, depth information, and captured images to, for example, create a virtual screen, adapt the user interface, and control apps/games 2255. According to a further embodiment, the provision of a computational description, image data, and/or a depth image can be made directly to the multimedia content generator 2204, obviating the need for the image processing system 2202, or at least some of its elements.

A motion tracking engine 2260 uses the skeletal and/or facial tracking models and the depth information to provide a control output to one or more apps/games 2255 running on the multimedia content generator 2204 to which the image processing system 2202 is coupled. The information may also be used by a gesture recognition engine 2265, depth image processing engine 2270, and/or operating system 2275.

The depth image processing engine 2270 uses the depth images to track motion of objects, such as the user and other objects. The depth image processing engine 2270 will typically report to the operating system 2275 an identification of each object detected and the location of the object for each frame. The operating system 2275 can use that information to update the position or movement of an avatar, for example, or other images shown on a display, for example display 14, or to perform an action on the user interface.

The gesture recognition engine 2265 may utilize a gestures library (not shown) that can include a collection of gesture filters, each comprising information concerning a gesture that may be performed, for example, by a skeletal model (as the user moves). The gesture recognition engine 2265 may compare the frames captured by the image processing system 2202 in the form of the skeletal model and movements associated with it to the gesture filters in the gesture library to identify when a user (as represented by the skeletal model) has performed one or more gestures. Those gestures may be associated with various controls of an application and direct the system to open the personalized home screen as described above. Thus, the multimedia content generator 2204 may employ the gestures library to interpret movements of the skeletal model and to control an operating system or an application running on the multimedia console based on the movements.

In some implementations, various aspects of the functionalities provided by the apps/games 2255, motion tracking engine 2260, gesture recognition engine 2265, depth image processing engine 2270, and/or operating system 2275 may be directly implemented on the image processing system 2202 itself. In another embodiment, the functions and or features described above with respect to the multimedia content generator 2204 may be performed and/or incorporated into a multimedia gaming console 24, described above and further below. For example the image processing system 2202 may provide image information to the multimedia gaming console 24 to implement a natural user interface, among other features and functions.

Figure 18:
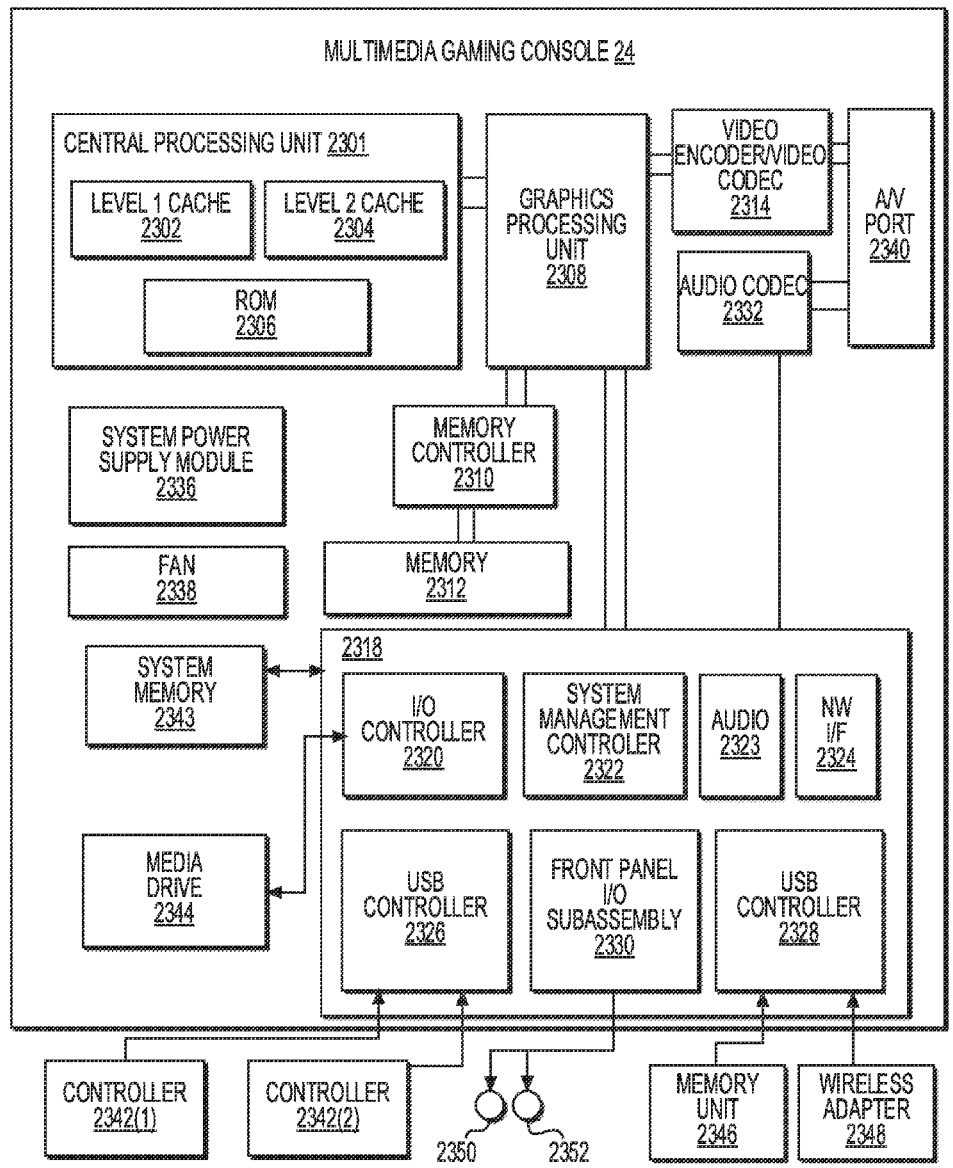
FIG. 18 shows a functional block diagram of an illustrative multimedia console that may be used in part to implement the present context-adaptive allocation of render model resources.

FIG. 18 is an illustrative functional block diagram of the multimedia gaming console 24. The multimedia gaming console 24 has a central processing unit (CPU) 2301 having a level 1 cache 2302, a level 2 cache 2304, and a Flash ROM (Read Only Memory) 2306. The level 1 cache 2302 and the level 2 cache 2304 temporarily store data and hence reduce the number of memory access cycles, thereby improving processing speed and throughput. The CPU 2301 may be configured with more than one core, and thus, additional level 1 and level 2 caches 2302 and 2304. The Flash ROM 2306 may store executable code that is loaded during an initial phase of a boot process when the multimedia gaming console 24 is powered ON.

A graphics processing unit (GPU) 2308 and a video encoder/video codec (coder/decoder) 2314 form a video processing pipeline for high speed and high resolution graphics processing. Data is carried from the GPU 2308 to the video encoder/video codec 2314 via a bus. The video processing pipeline outputs data to an A/V (audio/video) port 2340 for transmission to a television or other display. A memory controller 2310 is connected to the GPU 2308 to facilitate processor access to various types of memory 2312, such as, but not limited to, a RAM.

The multimedia gaming console 24 includes an I/O controller 2320, a system management controller 2322, an audio processing unit 2323, a network interface controller 2324, a first USB (Universal Serial Bus) host controller 2326, a second USB controller 2328, and a front panel I/O subassembly 2330 that are preferably implemented on a module 2318. The USB controllers 2326 and 2328 serve as hosts for peripheral controllers 2342(1) and 2342(2), a wireless adapter 2348, and an external memory device 2346 (e.g., Flash memory, external CD/DVD ROM drive, removable media, etc.). The network interface controller 2324 and/or wireless adapter 2348 provide access to a network (e.g., the Internet, home network, etc.) and may be any of a wide variety of various wired or wireless adapter components including an Ethernet card, a modem, a Bluetooth module, a cable modem, or the like.

System memory 2343 is provided to store application data that is loaded during the boot process. A media drive 2344 is provided and may comprise a DVD/CD drive, hard drive, or other removable media drive, etc. The media drive 2344 may be internal or external to the multimedia gaming console 24. Application data may be accessed via the media drive 2344 for execution, playback, etc. by the multimedia gaming console 24. The media drive 2344 is connected to the I/O controller 2320 via a bus, such as a Serial ATA bus or other high speed connection (e.g., IEEE 1394).

The system management controller 2322 provides a variety of service functions related to assuring availability of the multimedia gaming console 24. The audio processing unit 2323 and an audio codec 2332 form a corresponding audio processing pipeline with high fidelity and stereo processing. Audio data is carried between the audio processing unit 2323 and the audio codec 2332 via a communication link. The audio processing pipeline outputs data to the A/V port 2340 for reproduction by an external audio player or device having audio capabilities.

The front panel I/O subassembly 2330 supports the functionality of the power button 2350 and the eject button 2352, as well as any LEDs (light emitting diodes) or other indicators exposed on the outer surface of the multimedia gaming console 24. A system power supply module 2336 provides power to the components of the multimedia gaming console 24. A fan 2338 cools the circuitry within the multimedia gaming console 24.

The CPU 2301, GPU 2308, memory controller 2310, and various other components within the multimedia gaming console 24 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia gaming console 24 is powered ON, application data may be loaded from the system memory 2343 into memory 2312 and/or caches 2302 and 2304 and executed on the CPU 2301. The application may present a graphical user interface that provides a consistent user experience when navigating to different media types available on the multimedia gaming console 24. In operation, applications and/or other media contained within the media drive 2344 may be launched or played from the media drive 2344 to provide additional functionalities to the multimedia gaming console 24.

The multimedia gaming console 24 may be operated as a standalone system by simply connecting the system to a television or other display. In this standalone mode, the multimedia gaming console 24 allows one or more users to interact with the system, watch movies, or listen to music. However, with the integration of broadband connectivity made available through the network interface controller 2324 or the wireless adapter 2348, the multimedia gaming console 24 may further be operated as a participant in a larger network community.

When the multimedia gaming console 24 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia gaming console 24 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 2301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 2342(1) and 2342(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present context-adaptive allocation of render model resources are now presented by way of illustration and not as an exhaustive list of all embodiments. An example includes a method of communicating a three-dimensional scene to a rendering device, the method comprising: providing a computational description of a three-dimensional scene to be rendered, the three-dimensional scene comprising visual elements; using a computing device, performing an automated evaluation of the three-dimensional scene to identify predetermined visual elements having an elevated perceptual importance to the three-dimensional scene; assigning an importance weight to the visual elements of the three-dimensional scene, the respective importance weight of each visual element being related to the perceptual importance of the corresponding visual element; and preparing the computational description for transmission to a rendering device, including reducing a level of detail in the computational description to conform with one or more resource constraints related to the rendering device, the level of detail being reduced non-uniformly with respect to the visual elements of the three-dimensional scene, in which visual elements having a corresponding higher importance weight are preserved at a higher level of detail.

In another example, the method further comprises defining the predetermined visual elements having an elevated perceptual importance to the three-dimensional scene in which the predetermined visual elements include a predetermined text element, graphic element, known part or whole of a subject of interest. In another example, the method further comprises defining the predetermined visual elements having an elevated perceptual importance to the three-dimensional scene in which the predetermined visual elements include at least one of a graphic advertisement, graphic logo, merchandise sample, a known part or whole of an animal, or a visual representation of all or part of a human body. In another example, the method further comprises performing an automated evaluation in which at least one of skeletal tracking, hand tracking, and face detection is implemented. In another example, the method further comprises providing the computational description of a three-dimensional scene in which a representation of one or more solid objects includes one or more corresponding wireframe meshes and respective texture maps, the wireframe meshes comprising points and edges which form polygonal faces, the wireframe meshes corresponding to the boundaries of the solid objects, the texture maps comprising texels forming a two-dimensional representation of a surface detail for the respective solid objects; assigning an importance weight to a point or texel comprised in the visual elements, the importance weight of the point or texel being related to the importance weight of the respective visual element; and reducing a level of detail in the computational description comprising at least one of: a) discarding certain points and edges from at least one of the wireframe meshes, and adding edges between the remaining points, and b) consolidating texels of at least one of the texture maps, in which the likelihood of any particular point being discarded, or particular texel being consolidated varies inversely with the importance weight of that point or texel. In another example, the method further comprises assigning an importance weight to a coordinate location on a polygonal face comprised in the visual elements, the importance weight of the coordinate location being related to the importance weight of the respective visual element; and reducing a level of detail in the computational description further comprising: consolidating certain polygonal faces from at least one of the wireframe meshes, in which the likelihood of any particular polygonal face being discarded varies inversely with the importance weight of a coordinate location on that polygonal face. In another example, the method further comprises assigning the importance weight to a point and an adjacent or overlying texel independently of one another. In another example, the method further comprises performing the automated evaluation of the three-dimensional scene in which a plurality of evaluations are performed on a plurality of images of the three-dimensional scene, and identifying predetermined visual elements having an elevated perceptual importance as related to a combination of the plurality of evaluations. In another example, the method further comprises performing the automated evaluation of the three-dimensional scene on a plurality of images of the three-dimensional scene in which the plurality of images vary from one another in either spatial or temporal location within the scene. In another example, the method further comprises receiving a user designation of visual elements having an elevated perceptual importance; and assigning an importance weight to the visual elements of the three-dimensional scene, in which the respective importance weight of each visual element is related to the user designation, or a combination of the user designation and the automated evaluation. In another example, the method further comprises preparing the computational description for transmission to a rendering device, including preserving geometrical form of visual elements having a corresponding higher importance weight, the preserved geometric form imparting a higher level of perceived visual quality.

A further example includes a server device configured for communicating a three-dimensional scene to a rendering device, the server device comprising: one or more processors; a network interface for supporting communications with the rendering device; and one or more memories storing computer-readable instructions which, when executed by the one or more processors, cause the one or more processors to perform a method of communicating a three-dimensional scene to a rendering device, the method comprising the steps of: providing a computational description of a three-dimensional scene to be rendered, the three-dimensional scene comprising visual elements; using the one or more processors, performing an automated evaluation of the three-dimensional scene to identify predetermined visual elements having an elevated perceptual importance to the three-dimensional scene; assigning an importance weight to the visual elements of the three-dimensional scene, the respective importance weight of each visual element being related to the perceptual importance of the corresponding visual element; and preparing the computational description for transmission to a rendering device, including reducing a level of detail in the computational description to conform with one or more resource constraints related to the rendering device, the level of detail being reduced non-uniformly with respect to the visual elements of the three-dimensional scene, in which visual elements having a corresponding higher importance weight are preserved at a higher level of detail.

In another example, the server device further comprises the one or more memories storing computer-readable instructions which, when executed by the one or more processors, cause the one or more processors to define the predetermined visual elements having an elevated perceptual importance to the three-dimensional scene in which the predetermined visual elements include a predetermined text element, graphic element, or a known part or whole of a subject of interest. In another example, the server device further comprises the one or more memories storing computer-readable instructions which, when executed by the one or more processors, cause the one or more processors to provide the computational description of a three-dimensional scene in which a representation of one or more solid objects includes one or more corresponding wireframe meshes and respective texture maps, the wireframe meshes comprising points and edges which form polygonal faces, the wireframe meshes corresponding to the boundaries of the solid objects, the texture maps comprising texels forming a two-dimensional representation of a surface detail for the respective solid objects; assigning an importance weight to a point or texel comprised in the visual elements, the importance weight of the point or texel being related to the importance weight of the respective visual element; and reducing a level of detail in the computational description comprising at least one of: a) discarding certain points and edges from at least one of the wireframe meshes, and adding edges between the remaining points, and b) consolidating texels of at least one of the texture maps, in which the likelihood of any particular point being discarded, or particular texel being consolidated varies inversely with the importance weight of that point or texel. In another example, the server device further comprises the one or more memories storing computer-readable instructions which, when executed by the one or more processors, cause the one or more processors to assign the importance weight to a point and an adjacent or overlying texel independently of one another. In another example, the server device further comprises the one or more memories storing computer-readable instructions which, when executed by the one or more processors, cause the one or more processors to perform the automated evaluation of the three-dimensional scene in which a plurality of evaluations are performed on a plurality of images of the three-dimensional scene, and identifying predetermined visual elements having an elevated perceptual importance is related to a combination of the plurality of evaluations. In another example, the server device further comprises the one or more memories storing computer-readable instructions which, when executed by the one or more processors, cause the one or more processors to: receive a user designation of visual elements having an elevated perceptual importance; and assign an importance weight to the visual elements of the three-dimensional scene, in which the respective importance weight of each visual element is related to the user designation, or a combination of the user designation and the automated evaluation.

A further example includes a system for rendering a three-dimensional scene, the system comprising: a client-side rendering device having at least a rendering processor and a display; a server-side device having: one or more server processors; a network interface for supporting communications with the client-side rendering device; and one or more memories storing computer-readable instructions which, when executed by the one or more server processors, cause the one or more server processors to perform a method of communicating a three-dimensional scene to a rendering device, the method comprising the steps of: providing a computational description of a three-dimensional scene to be rendered, the three-dimensional scene comprising visual elements; using the one or more server processors, performing an automated evaluation of the three-dimensional scene to identify predetermined visual elements having an elevated perceptual importance to the three-dimensional scene; assigning an importance weight to the visual elements of the three-dimensional scene, the respective importance weight of each visual element being related to the perceptual importance of the corresponding visual element; and preparing the computational description for transmission to the client-side rendering device, including reducing a level of detail in the computational description to conform with one or more resource constraints related to the client-side rendering device, the level of detail being reduced non-uniformly with respect to the visual elements of the three-dimensional scene, in which visual elements having a corresponding higher importance weight are preserved at a higher level of detail.

In another example, the system further comprises the one or more memories storing computer-readable instructions which, when executed by the one or more server processors, cause the one or more server processors to provide the computational description of a three-dimensional scene in which a representation of one or more solid objects includes one or more corresponding wireframe meshes and respective texture maps, the wireframe meshes comprising points and edges which form polygonal faces, the wireframe meshes corresponding to the boundaries of the solid objects, the texture maps comprising texels forming a two-dimensional representation of a surface detail for the respective solid objects; assigning an importance weight to a point or texel comprised in the visual elements, the importance weight of the point or texel being related to the importance weight of the respective visual element; and reducing a level of detail in the computational description comprising at least one of: a) discarding certain points and edges from at least one of the wireframe meshes, and adding edges between the remaining points, and b) consolidating texels of at least one of the texture maps, in which the likelihood of any particular point being discarded, or particular texel being consolidated varies inversely with the importance weight of that point or texel. In another example, the system further comprises the one or more memories storing computer-readable instructions which, when executed by the one or more server processors, cause the one or more server processors to: receive a user designation of visual elements having an elevated perceptual importance; and assign an importance weight to the visual elements of the three-dimensional scene, in which the respective importance weight of each visual element is related to the user designation, or a combination of the user designation and the automated evaluation.

Based on the foregoing, it may be appreciated that technologies for implementing context-adaptive allocation of render model resources have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the examples and applications illustrated and described, and without departing from the true spirit and scope of the present invention, which is set forth in the following claims.

What is claimed:

1. A method of communicating a three-dimensional scene to a rendering device, the method comprising:
    providing a computational description of the three-dimensional scene to be rendered, the three-dimensional scene comprising visual elements;
    utilizing a skeletal tracker to detect skeletal parts of a body within the three-dimensional scene;
    using a computing device, performing an automated evaluation of the three-dimensional scene to identify predetermined visual elements having an elevated perceptual importance to the three-dimensional scene;
    assigning an importance weight to the visual elements of the three-dimensional scene, the respective importance weight of each visual element being related to the perceptual importance of the corresponding visual element among other visual elements, and using the detected skeletal parts of the body, assigning importance weight to respective detected skeletal parts of the body relative to other detected skeletal parts of the body within the three-dimensional scene; and
    preparing the computational description for transmission to the rendering device, including reducing a level of detail in the computational description to conform with one or more resource constraints related to the rendering device, the level of detail being reduced non-uniformly with respect to the visual elements of the three-dimensional scene, in which visual elements, including the skeletal parts of the body, having a corresponding higher importance weight are preserved at a higher level of detail.

2. The method according to claim 1, further comprising defining the predetermined visual elements having an elevated perceptual importance to the three-dimensional scene in which the predetermined visual elements include a predetermined text element, graphic element, known part or whole of a subject of interest.

3. The method according to claim 2, further comprising defining the predetermined visual elements having an elevated perceptual importance to the three-dimensional scene in which the predetermined visual elements further include at least one of a graphic advertisement, graphic logo, merchandise sample, or a known part or whole of an animal.

4. The method according to claim 1, further comprising performing an automated evaluation in which hand tracking is implemented, wherein the computing device further assigns the importance weight to one or more hands of the body.

5. The method according to claim 1, further comprising providing the computational description of the three-dimensional scene in which a representation of one or more solid objects includes one or more corresponding wireframe meshes and respective texture maps,
    the wireframe meshes comprising points and edges which form polygonal faces, the wireframe meshes corresponding to boundaries of the one or more solid objects,
    the texture maps comprising texels forming a two-dimensional representation of a surface detail for the respective one or more solid objects;
    assigning an importance weight to a point or texel comprised in the visual elements, the importance weight of the point or texel being related to the importance weight of the respective visual element; and
    reducing a level of detail in the computational description comprising at least one of:
        a) discarding certain points and edges from at least one of the wireframe meshes, and adding edges between the remaining points, and
        b) consolidating texels of at least one of the texture maps,
    in which the likelihood of any particular point being discarded, or particular texel being consolidated varies inversely with the importance weight of that point or texel.

6. The method according to claim 5, further comprising assigning an importance weight to a coordinate location on a polygonal face comprised in the visual elements, the importance weight of the coordinate location being related to the importance weight of the respective visual element; and
    reducing a level of detail in the computational description further comprising:
        consolidating certain polygonal faces from at least one of the wireframe meshes, in which the likelihood of any particular polygonal face being discarded varies inversely with the importance weight of a coordinate location on that polygonal face.

7. The method according to claim 5, further comprising assigning the importance weight to a point and an adjacent or overlying texel independently of one another.

8. The method according to claim 1, further comprising performing the automated evaluation of the three-dimensional scene in which a plurality of evaluations are performed on a plurality of images of the three-dimensional scene, and identifying predetermined visual elements having an elevated perceptual importance as related to a combination of the plurality of evaluations.

9. The method according to claim 8, further comprising performing the automated evaluation of the three-dimensional scene on a plurality of images of the three-dimensional scene in which the plurality of images vary from one another in either spatial or temporal location within the scene.

10. The method according to claim 1, further comprising:
    preparing the computational description for transmission to the rendering device, including preserving geometrical form of visual elements having a corresponding higher importance weight, the preserved geometric form imparting a higher level of perceived visual quality.

11. The method according to claim 1, wherein the detected skeletal parts of the body include a representation of an entire body of a human, and each of the detected skeletal parts of the entire body are assigned the importance weight relative to other detected skeletal parts of the body.

12. A system for rendering a three-dimensional scene, the system comprising:
a client-side rendering device having at least a rendering processor and a display;
a server-side device having:
one or more server processors;
a network interface for supporting communications with the client-side rendering device; and
one or more memories storing computer-readable instructions which, when executed by the one or more server processors, cause the one or more server processors to perform a method of communicating the three-dimensional scene to the client-side rendering device, the method comprising the steps of:
providing a computational description of the three-dimensional scene to be rendered, the three-dimensional scene comprising visual elements;
utilizing a skeletal tracker to detect skeletal parts of a body within the three-dimensional scene;
identifying edge definition, geometric patterns, and curvature of objects appearing within the three-dimensional scene;
using the one or more server processors, performing an automated evaluation of the three-dimensional scene to identify predetermined visual elements having an elevated perceptual importance to the three-dimensional scene;
assigning an importance weight to the visual elements of the three-dimensional scene, the respective importance weight of each visual element being related to the perceptual importance of the corresponding visual element among other visual elements, in which:
using the detected skeletal parts of the body, assigning importance weight to respective detected skeletal parts of the body relative to other detected skeletal parts of the body within the three-dimensional scene; and
using the identified edge definition, geometric patterns, and curvature of objects to assign importance weight to visual elements within the three-dimensional scene; and
preparing the computational description for transmission to the client-side rendering device, including reducing a level of detail in the computational description to conform with one or more resource constraints related to the client-side rendering device, the level of detail being reduced non-uniformly with respect to the visual elements of the three-dimensional scene, in which visual elements, including the skeletal parts of the body, having a corresponding higher importance weight are preserved at a higher level of detail.

13. The system according to claim 12, further comprising the one or more memories storing computer-readable instructions which, when executed by the one or more server processors, cause the one or more server processors to provide the computational description of the three-dimensional scene in which a representation of one or more solid objects includes one or more corresponding wireframe meshes and respective texture maps,
the wireframe meshes comprising points and edges which form polygonal faces, the wireframe meshes corresponding to boundaries of the one or more solid objects,
the texture maps comprising texels forming a two-dimensional representation of a surface detail for the respective one or more solid objects;
assigning an importance weight to a point or texel comprised in the visual elements, the importance weight of the point or texel being related to the importance weight of the respective visual element; and
reducing a level of detail in the computational description comprising at least one of:
a) discarding certain points and edges from at least one of the wireframe meshes, and adding edges between the remaining points, and
b) consolidating texels of at least one of the texture maps,
in which the likelihood of any particular point being discarded, or particular texel being consolidated varies inversely with the importance weight of that point or texel.

14. The system according to claim 12, further comprising the one or more memories storing computer-readable instructions which, when executed by the one or more server processors, cause the one or more server processors to:
receive a user designation of visual elements having an elevated perceptual importance; and
assign an importance weight to the visual elements of the three-dimensional scene, in which the respective importance weight of each visual element is related to the user designation, or a combination of the user designation and the automated evaluation.

* * * * *